US008963702B2

(12) United States Patent
Follmer et al.

(10) Patent No.: US 8,963,702 B2
(45) Date of Patent: *Feb. 24, 2015

(54) SYSTEM AND METHOD FOR VIEWING AND CORRECTING DATA IN A STREET MAPPING DATABASE

(75) Inventors: Todd W. Follmer, Park City, UT (US); Scott McClellan, Heber, UT (US)

(73) Assignee: inthinc Technology Solutions, Inc., West Valley City, UT (US)

( * ) Notice: Subject to any disclaimer, the term of this patent is extended or adjusted under 35 U.S.C. 154(b) by 702 days.

This patent is subject to a terminal disclaimer.

(21) Appl. No.: 12/379,153

(22) Filed: Feb. 13, 2009

(65) Prior Publication Data
US 2010/0207751 A1   Aug. 19, 2010

(51) Int. Cl.
| | |
|---|---|
| *B60Q 1/00* | (2006.01) |
| *G06G 7/70* | (2006.01) |
| *G08G 1/00* | (2006.01) |
| *B60R 25/10* | (2013.01) |
| *B60Q 1/50* | (2006.01) |
| *G01C 21/32* | (2006.01) |
| *G01C 21/36* | (2006.01) |

(52) U.S. Cl.
CPC ............ *G01C 21/32* (2013.01); *G01C 21/3697* (2013.01)
USPC ...... 340/439; 340/905; 340/995.13; 340/460; 340/426.15; 340/426.22; 340/438; 340/441; 340/467; 340/453; 701/117

(58) Field of Classification Search
USPC .................................. 340/439, 905
See application file for complete search history.

(56) References Cited

U.S. PATENT DOCUMENTS

| | | | |
|---|---|---|---|
| 3,975,708 A | 8/1976 | Lusk | |
| 4,241,403 A | 12/1980 | Schultz | ......................... 364/300 |
| 4,344,136 A * | 8/1982 | Panik | ........................... 701/33.4 |
| 4,369,427 A | 1/1983 | Drebinger et al. | |
| 4,395,624 A | 7/1983 | Wartski | |

(Continued)

FOREIGN PATENT DOCUMENTS

| | | |
|---|---|---|
| CA | 2071931 | 12/1993 |
| CA | 2307259 | 10/2001 |

(Continued)

OTHER PUBLICATIONS

Author: Google Maps, Title: Google Maps, Capture on Dec. 29, 2014, Pertinent Pages: Whole Document.*

(Continued)

*Primary Examiner* — Steven Lim
*Assistant Examiner* — Muhammad Adnan
(74) *Attorney, Agent, or Firm* — Workman Nydegger (57) ABSTRACT

A system and method for detecting use of a wireless device is disclosed. In one embodiment, a system and method for using street map data broadcasts a warning to a driver, wherein the warning is triggered when a vehicle operating parameter does not comply with a limitation for a current street in a street mapping database. The limitation for the current street is also broadcast to the driver. An indication that the limitation for the current street is incorrect is received from the driver. The warning to the driver may be an audible warning and/or a visual warning to the driver. Broadcasting a limitation for the current street may include displaying the limitation to the driver or playing a spoken message to the driver. The limitation may be a posted speed limit or a traffic direction, for example.

26 Claims, 5 Drawing Sheets

(56) References Cited

U.S. PATENT DOCUMENTS

| | | | |
|---|---|---|---|
| 4,419,654 A | 12/1983 | Funk |
| 4,458,535 A | 7/1984 | Juergens |
| 4,591,823 A | 5/1986 | Horvat |
| 4,785,280 A | 11/1988 | Fubini |
| 4,843,578 A | 6/1989 | Wade |
| 4,926,417 A | 5/1990 | Futami |
| 4,939,652 A | 7/1990 | Steiner |
| 5,006,829 A * | 4/1991 | Miyamoto et al. | 340/459 |
| 5,032,821 A | 7/1991 | Domanico |
| 5,064,151 A | 11/1991 | Cerimele et al. |
| 5,074,144 A | 12/1991 | Krofchalk et al. |
| 5,119,504 A | 6/1992 | Durboraw, III |
| 5,223,844 A | 6/1993 | Mansell et al. |
| 5,225,842 A | 7/1993 | Brown et al. |
| 5,303,163 A | 4/1994 | Ebaugh et al. | 364/550 |
| 5,305,214 A | 4/1994 | Komatsu |
| 5,309,139 A | 5/1994 | Austin |
| 5,311,197 A | 5/1994 | Sorden et al. |
| 5,325,082 A | 6/1994 | Rodriguez |
| 5,347,260 A | 9/1994 | Ginzel |
| 5,353,023 A | 10/1994 | Mitsugi |
| 5,359,528 A | 10/1994 | Haendel |
| 5,365,114 A | 11/1994 | Tsurushima |
| 5,365,451 A | 11/1994 | Wang et al. |
| 5,381,155 A * | 1/1995 | Gerber | 342/104 |
| 5,394,136 A | 2/1995 | Lammers et al. |
| 5,400,018 A | 3/1995 | Scholl |
| 5,414,432 A | 5/1995 | Penny, Jr. et al. |
| 5,422,624 A | 6/1995 | Smith |
| 5,424,584 A | 6/1995 | Matsuda |
| 5,430,432 A * | 7/1995 | Camhi et al. | 340/438 |
| 5,436,612 A | 7/1995 | Aduddell |
| 5,436,837 A | 7/1995 | Gerstung |
| 5,446,659 A | 8/1995 | Yamawaki |
| 5,453,939 A | 9/1995 | Hoffman |
| 5,457,439 A | 10/1995 | Kuhn |
| 5,475,597 A | 12/1995 | Buck |
| 5,485,116 A | 1/1996 | Cserveny et al. |
| 5,485,161 A | 1/1996 | Vaughn |
| 5,499,182 A | 3/1996 | Ousborne |
| 5,521,579 A | 5/1996 | Bernhard |
| 5,521,580 A | 5/1996 | Kaneko |
| 5,525,960 A | 6/1996 | McCall |
| 5,546,305 A | 8/1996 | Kondo |
| 5,548,273 A | 8/1996 | Nicol |
| 5,570,087 A | 10/1996 | Lemelson |
| 5,581,464 A | 12/1996 | Woll |
| 5,586,130 A | 12/1996 | Doyle |
| 5,600,558 A | 2/1997 | Mearek |
| 5,612,875 A | 3/1997 | Haendel |
| 5,617,086 A | 4/1997 | Klashinsky et al. | 340/907 |
| 5,625,337 A | 4/1997 | Medawar |
| 5,638,077 A | 6/1997 | Martin |
| 5,642,284 A | 6/1997 | Parupalli |
| 5,648,755 A | 7/1997 | Yagihashi |
| 5,659,289 A | 8/1997 | Zonkoski |
| 5,689,067 A | 11/1997 | Klein |
| 5,708,417 A | 1/1998 | Tallman |
| 5,717,374 A | 2/1998 | Smith |
| 5,719,771 A | 2/1998 | Buck |
| 5,723,768 A | 3/1998 | Ammon |
| 5,731,285 A | 3/1998 | Pavone et al. |
| 5,731,785 A | 3/1998 | Lemelson et al. |
| 5,740,548 A | 4/1998 | Hudgens |
| 5,742,915 A | 4/1998 | Stafford |
| 5,751,245 A | 5/1998 | Janky et al. |
| 5,764,139 A | 6/1998 | Nojima |
| 5,767,767 A | 6/1998 | Lima |
| 5,777,580 A | 7/1998 | Janky et al. |
| 5,795,997 A | 8/1998 | Gittins |
| 5,797,134 A | 8/1998 | McMillan et al. |
| 5,801,618 A | 9/1998 | Jenkins |
| 5,801,948 A | 9/1998 | Wood |
| 5,815,071 A | 9/1998 | Doyle |
| 5,819,090 A | 10/1998 | Wolf et al. |
| 5,819,198 A * | 10/1998 | Peretz | 701/117 |
| 5,825,283 A | 10/1998 | Camhi |
| 5,825,284 A | 10/1998 | Dunwoody |
| 5,829,782 A | 11/1998 | Breed et al. |
| 5,844,475 A | 12/1998 | Horie |
| 5,847,271 A | 12/1998 | Poublon |
| 5,862,500 A | 1/1999 | Goodwin |
| 5,867,093 A | 2/1999 | Dodd |
| 5,877,678 A | 3/1999 | Donoho |
| 5,880,674 A | 3/1999 | Ufkes |
| 5,880,958 A | 3/1999 | Helms et al. |
| 5,883,594 A | 3/1999 | Lau |
| 5,892,434 A | 4/1999 | Carlson |
| 5,907,277 A | 5/1999 | Tokunaga |
| 5,914,654 A | 6/1999 | Smith |
| 5,918,180 A | 6/1999 | Dimino |
| 5,926,087 A | 7/1999 | Busch |
| 5,928,291 A | 7/1999 | Jenkins et al. |
| 5,933,080 A | 8/1999 | Nojima |
| 5,941,915 A | 8/1999 | Federle et al. | 701/1 |
| 5,945,919 A | 8/1999 | Trask |
| 5,949,330 A | 9/1999 | Hoffman |
| 5,949,331 A | 9/1999 | Schofield |
| 5,952,941 A | 9/1999 | Mardirossian |
| 5,954,781 A | 9/1999 | Slepian |
| 5,955,942 A | 9/1999 | Slifkin |
| 5,957,986 A | 9/1999 | Coverdill |
| 5,964,816 A | 10/1999 | Kincaid |
| 5,969,600 A | 10/1999 | Tanguay |
| 5,974,356 A | 10/1999 | Doyle et al. |
| 5,978,737 A | 11/1999 | Pawlowski |
| 5,982,278 A | 11/1999 | Cuvelier |
| 5,987,976 A | 11/1999 | Sarangapani |
| 5,999,125 A | 12/1999 | Kurby |
| 6,002,327 A | 12/1999 | Boesch |
| 6,008,724 A | 12/1999 | Thompson |
| 6,018,293 A | 1/2000 | Smith |
| 6,026,292 A | 2/2000 | Coppinger et al. |
| 6,028,508 A | 2/2000 | Mason |
| 6,028,510 A | 2/2000 | Tamam |
| 6,037,861 A | 3/2000 | Ying |
| 6,037,862 A | 3/2000 | Ying |
| 6,038,496 A | 3/2000 | Dobler |
| 6,044,315 A | 3/2000 | Honeck |
| 6,059,066 A | 5/2000 | Lary |
| 6,060,989 A | 5/2000 | Gehlot |
| 6,064,886 A | 5/2000 | Perez et al. |
| 6,064,928 A | 5/2000 | Wilson |
| 6,064,970 A | 5/2000 | McMillan et al. |
| 6,067,008 A | 5/2000 | Smith |
| 6,067,009 A | 5/2000 | Hozuka |
| 6,072,388 A | 6/2000 | Kyrtsos |
| 6,073,007 A | 6/2000 | Doyle |
| 6,075,458 A | 6/2000 | Ladner et al. |
| 6,078,853 A | 6/2000 | Ebner |
| 6,081,188 A | 6/2000 | Kutlucinar |
| 6,084,870 A | 7/2000 | Wooten et al. |
| 6,094,149 A | 7/2000 | Wilson |
| 6,098,048 A | 8/2000 | Dashefsky |
| 6,100,792 A | 8/2000 | Ogino |
| 6,104,282 A | 8/2000 | Fragoso |
| 6,108,591 A | 8/2000 | Segal et al. |
| 6,112,145 A | 8/2000 | Zachman |
| 6,121,922 A | 9/2000 | Mohan |
| 6,124,810 A | 9/2000 | Segal et al. |
| 6,130,608 A | 10/2000 | McKeown |
| 6,131,067 A | 10/2000 | Girerd et al. |
| 6,133,827 A | 10/2000 | Alvey |
| 6,138,516 A | 10/2000 | Tillman |
| 6,141,610 A | 10/2000 | Rothert |
| 6,147,598 A | 11/2000 | Murphy |
| 6,161,072 A | 12/2000 | Clapper | 701/93 |
| 6,172,602 B1 | 1/2001 | Hasfjord |
| 6,178,374 B1 | 1/2001 | Möhlenkamp et al. | 701/117 |
| 6,184,784 B1 | 2/2001 | Shibuya |
| 6,185,501 B1 | 2/2001 | Smith |
| 6,195,015 B1 | 2/2001 | Jacobs et al. |
| 6,198,995 B1 | 3/2001 | Settles |
| 6,204,756 B1 | 3/2001 | Senyk |

(56) References Cited

U.S. PATENT DOCUMENTS

| | | | |
|---|---|---|---|
| 6,204,757 B1 | 3/2001 | Evans | |
| 6,208,240 B1 | 3/2001 | Ledesma | |
| 6,212,455 B1 | 4/2001 | Weaver | |
| 6,216,066 B1 | 4/2001 | Goebel | |
| 6,222,458 B1 | 4/2001 | Harris | |
| 6,225,898 B1 | 5/2001 | Kamiya | |
| 6,227,862 B1 | 5/2001 | Harkness | |
| 6,229,438 B1 | 5/2001 | Kutlucinar | |
| 6,232,873 B1 | 5/2001 | Dilz | |
| 6,246,933 B1 | 6/2001 | Bague | |
| 6,246,948 B1 | 6/2001 | Thakker | |
| 6,247,360 B1 | 6/2001 | Anderson | |
| 6,249,219 B1 | 6/2001 | Perez | |
| 6,253,129 B1 | 6/2001 | Jenkins et al. | |
| 6,253,151 B1 | 6/2001 | Ohler et al. | |
| 6,255,892 B1 | 7/2001 | Gärtner | |
| 6,255,939 B1 | 7/2001 | Roth | |
| 6,262,657 B1 | 7/2001 | Okuda et al. | |
| 6,262,658 B1 | 7/2001 | O'Connor | |
| 6,265,989 B1 | 7/2001 | Taylor | |
| 6,266,588 B1 | 7/2001 | McClellan | |
| 6,278,361 B1 | 8/2001 | Magiawala | |
| 6,282,491 B1 | 8/2001 | Bochmann et al. | |
| 6,285,931 B1 | 9/2001 | Hattori | |
| 6,289,332 B2 | 9/2001 | Menig | |
| 6,294,988 B1 | 9/2001 | Shomura | |
| 6,294,989 B1 | 9/2001 | Schofield | |
| 6,295,492 B1 | 9/2001 | Lang | |
| 6,297,768 B1 | 10/2001 | Allen, Jr. | |
| 6,301,533 B1 | 10/2001 | Markow | |
| 6,306,063 B1 | 10/2001 | Horgan et al. | 477/108 |
| 6,308,120 B1 | 10/2001 | Good | |
| 6,308,134 B1 | 10/2001 | Croyle et al. | |
| 6,313,742 B1 | 11/2001 | Larson | |
| 6,314,367 B1 | 11/2001 | Ohler et al. | |
| 6,320,497 B1 | 11/2001 | Fukumoto | |
| 6,331,825 B1 | 12/2001 | Ladner et al. | |
| 6,333,686 B1 | 12/2001 | Waltzer | |
| 6,337,653 B1 | 1/2002 | Buchler | |
| 6,339,739 B1 | 1/2002 | Folke | |
| 6,339,745 B1 | 1/2002 | Novik | 701/208 |
| 6,343,301 B1 | 1/2002 | Halt et al. | 707/203 |
| 6,344,805 B1 | 2/2002 | Yasui | |
| 6,351,211 B1 | 2/2002 | Bussard | |
| 6,351,709 B2 | 2/2002 | King et al. | |
| 6,356,188 B1 | 3/2002 | Meyers | |
| 6,356,822 B1 | 3/2002 | Diaz | |
| 6,356,833 B2 | 3/2002 | Jeon | |
| 6,356,836 B1 | 3/2002 | Adolph | 701/208 |
| 6,359,554 B1 | 3/2002 | Skibinski | |
| 6,362,730 B2 | 3/2002 | Razavi | |
| 6,362,734 B1 | 3/2002 | McQuade | |
| 6,366,199 B1 | 4/2002 | Osborn | |
| 6,378,959 B2 | 4/2002 | Lesesky | |
| 6,385,533 B1 | 5/2002 | Halt et al. | 701/207 |
| 6,389,340 B1 | 5/2002 | Rayner | |
| 6,393,348 B1 | 5/2002 | Ziegler | |
| 6,401,029 B1 | 6/2002 | Kubota et al. | |
| 6,404,329 B1 | 6/2002 | Hsu | |
| 6,405,112 B1 | 6/2002 | Rayner | |
| 6,405,128 B1 | 6/2002 | Bechtolsheim et al. | 701/208 |
| 6,415,226 B1 | 7/2002 | Kozak | 701/210 |
| 6,424,268 B1 | 7/2002 | Isonaga | |
| 6,427,687 B1 | 8/2002 | Kirk | |
| 6,430,488 B1 | 8/2002 | Goldman | |
| 6,433,681 B1 | 8/2002 | Foo | |
| 6,438,472 B1 | 8/2002 | Tano et al. | |
| 6,441,732 B1 | 8/2002 | Laitsaari | |
| 6,449,540 B1 | 9/2002 | Rayner | |
| 6,459,365 B2 | 10/2002 | Tamura | |
| 6,459,367 B1 | 10/2002 | Green | |
| 6,459,369 B1 | 10/2002 | Wang | |
| 6,459,961 B1 | 10/2002 | Obradovich | |
| 6,459,969 B1 | 10/2002 | Bates | |
| 6,462,675 B1 | 10/2002 | Humphrey | |
| 6,472,979 B2 | 10/2002 | Schofield | |
| 6,476,763 B2 | 11/2002 | Allen, Jr. | |
| 6,480,106 B1 | 11/2002 | Crombez | |
| 6,484,035 B2 | 11/2002 | Allen, Jr. | |
| 6,484,091 B2 | 11/2002 | Shibata | |
| 6,493,650 B1 | 12/2002 | Rodgers | |
| 6,512,969 B1 | 1/2003 | Wang | |
| 6,515,596 B2 | 2/2003 | Awada | |
| 6,519,512 B1 | 2/2003 | Haas | |
| 6,523,912 B1 * | 2/2003 | Bond et al. | 303/9 |
| 6,525,672 B2 | 2/2003 | Chainer | |
| 6,526,341 B1 | 2/2003 | Bird et al. | |
| 6,529,159 B1 | 3/2003 | Fan et al. | |
| 6,535,116 B1 | 3/2003 | Zhou | |
| 6,542,074 B1 | 4/2003 | Tharman | |
| 6,542,794 B2 | 4/2003 | Obradovich | |
| 6,549,834 B2 | 4/2003 | McClellan | |
| 6,552,682 B1 | 4/2003 | Fan et al. | |
| 6,556,905 B1 | 4/2003 | Mittelsteadt | |
| 6,559,769 B2 | 5/2003 | Anthony | |
| 6,564,126 B1 | 5/2003 | Lin | |
| 6,567,000 B2 | 5/2003 | Slifkin | |
| 6,571,168 B1 | 5/2003 | Murphy | |
| 6,577,946 B2 | 6/2003 | Myr | |
| 6,587,759 B2 | 7/2003 | Obradovich | |
| 6,594,579 B1 | 7/2003 | Lowrey | |
| 6,599,243 B2 | 7/2003 | Woltermann | |
| 6,600,985 B2 | 7/2003 | Weaver | |
| 6,604,033 B1 | 8/2003 | Banet | |
| 6,609,063 B1 | 8/2003 | Bender et al. | 701/209 |
| 6,609,064 B1 | 8/2003 | Dean | 701/213 |
| 6,611,740 B2 | 8/2003 | Lowrey | |
| 6,611,755 B1 | 8/2003 | Coffee | |
| 6,615,137 B2 | 9/2003 | Lutter et al. | |
| 6,622,085 B1 | 9/2003 | Amita et al. | 701/208 |
| 6,629,029 B1 | 9/2003 | Giles | |
| 6,630,884 B1 | 10/2003 | Shanmugham | |
| 6,631,322 B1 | 10/2003 | Arthur et al. | 701/211 |
| 6,633,811 B1 | 10/2003 | Aumayer | 701/207 |
| 6,636,790 B1 | 10/2003 | Lightner | |
| 6,639,512 B1 | 10/2003 | Lee | |
| 6,643,578 B2 | 11/2003 | Levine | |
| 6,651,001 B2 | 11/2003 | Apsell | |
| 6,654,682 B2 | 11/2003 | Kane et al. | |
| 6,657,540 B2 | 12/2003 | Knapp | |
| 6,662,013 B2 | 12/2003 | Takiguchi et al. | |
| 6,662,141 B2 | 12/2003 | Kaub | 702/181 |
| 6,664,922 B1 | 12/2003 | Fan | |
| 6,665,613 B2 | 12/2003 | Duvall | |
| 6,674,362 B2 | 1/2004 | Yoshioka | |
| 6,675,085 B2 | 1/2004 | Straub | |
| 6,677,854 B2 | 1/2004 | Dix | |
| 6,678,612 B1 | 1/2004 | Khawam | |
| 6,696,932 B2 | 2/2004 | Skibinski | |
| 6,701,234 B1 | 3/2004 | Vogelsang | |
| 6,703,925 B2 | 3/2004 | Steffel | |
| 6,714,894 B1 | 3/2004 | Tobey et al. | 702/188 |
| 6,718,235 B1 | 4/2004 | Borugian | |
| 6,718,239 B2 | 4/2004 | Rayner | |
| 6,718,258 B1 | 4/2004 | Barton | |
| 6,720,889 B2 | 4/2004 | Yamaki et al. | |
| 6,727,809 B1 | 4/2004 | Smith | |
| 6,728,542 B2 | 4/2004 | Meda | |
| 6,728,605 B2 | 4/2004 | Lash | |
| 6,732,031 B1 | 5/2004 | Lowrey | |
| 6,732,032 B1 | 5/2004 | Lowrey | |
| 6,737,962 B2 | 5/2004 | Mayor | |
| 6,741,169 B2 | 5/2004 | Magiawala | |
| 6,741,170 B2 | 5/2004 | Alrabady | |
| 6,745,153 B2 | 6/2004 | White | |
| 6,748,322 B1 | 6/2004 | Fernandez | |
| 6,750,761 B1 | 6/2004 | Newman | |
| 6,750,762 B1 | 6/2004 | Porter | |
| 6,756,916 B2 | 6/2004 | Yanai | |
| 6,759,952 B2 | 7/2004 | Dunbridge | |
| 6,766,244 B2 | 7/2004 | Obata et al. | 701/207 |
| 6,768,448 B2 | 7/2004 | Farmer | |
| 6,775,602 B2 | 8/2004 | Gordon | |
| 6,778,068 B2 | 8/2004 | Wolfe | |

(56) References Cited

U.S. PATENT DOCUMENTS

| | | |
|---|---|---|
| 6,778,885 B2 | 8/2004 | Agashe et al. |
| 6,784,793 B2 | 8/2004 | Gagnon |
| 6,784,832 B2 | 8/2004 | Knockeart et al. |
| 6,788,196 B2 | 9/2004 | Ueda |
| 6,788,207 B2 | 9/2004 | Wilkerson |
| 6,792,339 B2 | 9/2004 | Basson |
| 6,795,017 B1 | 9/2004 | Puranik et al. |
| 6,798,354 B2 | 9/2004 | Schuessler |
| 6,803,854 B1 | 10/2004 | Adams et al. |
| 6,807,481 B1 | 10/2004 | Gastelum |
| 6,813,549 B2 | 11/2004 | Good |
| 6,819,236 B2 | 11/2004 | Kawai |
| 6,822,557 B1 | 11/2004 | Weber |
| 6,832,141 B2 | 12/2004 | Skeen et al. |
| 6,845,314 B2 | 1/2005 | Fosseen |
| 6,845,316 B2 | 1/2005 | Yates ........................... 701/117 |
| 6,845,317 B2 | 1/2005 | Craine |
| 6,847,871 B2 | 1/2005 | Malik et al. .................... 701/33 |
| 6,847,872 B2 | 1/2005 | Bodin |
| 6,847,873 B1 | 1/2005 | Li |
| 6,847,887 B1 | 1/2005 | Casino ......................... 701/208 |
| 6,850,841 B1 | 2/2005 | Casino ......................... 701/208 |
| 6,859,039 B2 | 2/2005 | Horie |
| 6,859,695 B2 | 2/2005 | Klausner |
| 6,865,457 B1 | 3/2005 | Mittelsteadt |
| 6,867,733 B2 | 3/2005 | Sandhu et al. |
| 6,868,386 B1 | 3/2005 | Henderson et al. |
| 6,870,469 B2 | 3/2005 | Ueda |
| 6,873,253 B2 | 3/2005 | Veziris |
| 6,873,261 B2 | 3/2005 | Anthony |
| 6,873,998 B1 | 3/2005 | Dorum et al. |
| 6,877,007 B1 | 4/2005 | Hentzel et al. |
| 6,879,894 B1 | 4/2005 | Lightner |
| 6,885,293 B2 | 4/2005 | Okumura |
| 6,888,495 B2 | 5/2005 | Flick |
| 6,892,131 B2 | 5/2005 | Coffee |
| 6,894,606 B2 | 5/2005 | Forbes et al. ................. 340/435 |
| 6,895,332 B2 | 5/2005 | King |
| 6,909,398 B2 | 6/2005 | Knockeart et al. |
| 6,909,947 B2 | 6/2005 | Douros et al. |
| 6,914,523 B2 | 7/2005 | Munch |
| 6,922,133 B2 | 7/2005 | Wolfe |
| 6,922,616 B2 | 7/2005 | Obradovich |
| 6,922,622 B2 | 7/2005 | Dulin |
| 6,925,425 B2 | 8/2005 | Remboski |
| 6,928,348 B1 | 8/2005 | Lightner |
| 6,937,162 B2 | 8/2005 | Tokitsu |
| 6,950,013 B2 | 9/2005 | Scaman |
| 6,954,140 B2 | 10/2005 | Holler |
| 6,957,133 B1 | 10/2005 | Hunt et al. |
| 6,958,976 B2 | 10/2005 | Kikkawa |
| 6,960,168 B2 | 11/2005 | Yanagidaira et al. |
| 6,965,827 B1 | 11/2005 | Wolfson ....................... 701/207 |
| 6,968,311 B2 | 11/2005 | Knockeart et al. |
| 6,970,075 B2 | 11/2005 | Cherouny |
| 6,970,783 B2 | 11/2005 | Knockeart et al. |
| 6,972,669 B2 | 12/2005 | Saito |
| 6,980,131 B1 | 12/2005 | Taylor |
| 6,981,565 B2 | 1/2006 | Gleacher |
| 6,982,636 B1 | 1/2006 | Bennie |
| 6,983,200 B2 | 1/2006 | Bodin |
| 6,988,033 B1 | 1/2006 | Lowrey |
| 6,988,034 B1 | 1/2006 | Marlatt et al. ................ 701/200 |
| 6,989,739 B2 | 1/2006 | Li |
| 7,002,454 B1 | 2/2006 | Gustafson |
| 7,002,579 B2 | 2/2006 | Olson |
| 7,005,975 B2 | 2/2006 | Lehner |
| 7,006,820 B1 | 2/2006 | Parker et al. |
| 7,019,641 B1 | 3/2006 | Lakshmanan |
| 7,023,321 B2 | 4/2006 | Brillon et al. |
| 7,023,332 B2 | 4/2006 | Saito |
| 7,024,318 B2 | 4/2006 | Fischer |
| 7,027,808 B2 | 4/2006 | Wesby |
| 7,034,705 B2 | 4/2006 | Yoshioka |
| 7,038,578 B2 | 5/2006 | Will |
| 7,042,347 B2 | 5/2006 | Cherouny |
| 7,047,114 B1 | 5/2006 | Rogers |
| 7,049,941 B2 | 5/2006 | Rivera-Cintron |
| 7,054,742 B2 | 5/2006 | Khavakh et al. .............. 701/209 |
| 7,059,689 B2 | 6/2006 | Lesesky |
| 7,069,126 B2 | 6/2006 | Bernard |
| 7,069,134 B2 | 6/2006 | Williams |
| 7,072,753 B2 | 7/2006 | Eberle |
| 7,081,811 B2 | 7/2006 | Johnston |
| 7,084,755 B1 | 8/2006 | Nord |
| 7,088,225 B2 | 8/2006 | Yoshioka |
| 7,089,116 B2 | 8/2006 | Smith |
| 7,091,880 B2 | 8/2006 | Sorensen |
| 7,098,812 B2 | 8/2006 | Hirota |
| 7,099,750 B2 | 8/2006 | Miyazawa |
| 7,099,774 B2 | 8/2006 | King |
| 7,102,496 B1 | 9/2006 | Ernst |
| 7,109,850 B2 | 9/2006 | Kawazoe et al. |
| 7,109,853 B1 | 9/2006 | Mattson |
| 7,113,081 B2 | 9/2006 | Reichow |
| 7,113,107 B2 | 9/2006 | Taylor |
| 7,113,127 B1 | 9/2006 | Banet et al. |
| 7,117,075 B1 | 10/2006 | Larschan et al. |
| 7,119,696 B2 | 10/2006 | Borugian |
| 7,124,027 B1 | 10/2006 | Ernst |
| 7,124,088 B2 | 10/2006 | Bauer et al. |
| 7,129,825 B2 | 10/2006 | Weber |
| 7,132,934 B2 | 11/2006 | Allison |
| 7,132,937 B2 | 11/2006 | Lu |
| 7,132,938 B2 | 11/2006 | Suzuki |
| 7,133,755 B2 | 11/2006 | Salman |
| 7,135,983 B2 | 11/2006 | Filippov |
| 7,138,916 B2 | 11/2006 | Schwartz |
| 7,139,661 B2 | 11/2006 | Holze |
| 7,142,196 B1 | 11/2006 | Connor et al. |
| 7,145,442 B1 | 12/2006 | Wai |
| 7,149,206 B2 | 12/2006 | Pruzan |
| 7,155,259 B2 | 12/2006 | Bauchot et al. |
| 7,155,321 B2 | 12/2006 | Bromley et al. ................ 701/29 |
| 7,161,473 B2 | 1/2007 | Hoshal |
| 7,164,986 B2 | 1/2007 | Humphries |
| 7,170,390 B2 | 1/2007 | Quiñones |
| 7,170,400 B2 | 1/2007 | Cowelchuk |
| 7,174,243 B1 | 2/2007 | Lightner |
| 7,176,813 B2 | 2/2007 | Kawamata et al. ...... 340/995.13 |
| 7,180,407 B1 | 2/2007 | Guo |
| 7,180,409 B2 | 2/2007 | Brey |
| 7,183,942 B2 | 2/2007 | Rock et al. .................... 340/905 |
| 7,187,271 B2 | 3/2007 | Nagata |
| 7,196,629 B2 | 3/2007 | Ruoss |
| 7,197,500 B1 | 3/2007 | Israni et al. ................... 707/100 |
| 7,216,022 B2 | 5/2007 | Kynast et al. ..................... 701/1 |
| 7,216,035 B2 | 5/2007 | Hörtner |
| 7,218,211 B2 | 5/2007 | Ho |
| 7,218,924 B2 | 5/2007 | McArdle |
| 7,222,009 B2 | 5/2007 | Hijikata |
| 7,225,060 B2 | 5/2007 | O'Conner et al. |
| 7,225,065 B1 | 5/2007 | Hunt |
| 7,228,211 B1 | 6/2007 | Lowrey |
| 7,233,235 B2 | 6/2007 | Pavlish |
| 7,236,862 B2 | 6/2007 | Kanno |
| 7,239,948 B2 | 7/2007 | Nimmo |
| 7,256,686 B2 | 8/2007 | Koutsky |
| 7,256,700 B1 | 8/2007 | Ruocco |
| 7,256,702 B2 | 8/2007 | Isaacs |
| 7,260,497 B2 | 8/2007 | Watabe |
| RE39,845 E | 9/2007 | Hasfjord |
| 7,269,507 B2 | 9/2007 | Cayford ....................... 701/208 |
| 7,269,530 B1 | 9/2007 | Lin |
| 7,271,716 B2 | 9/2007 | Nou |
| 7,273,172 B2 | 9/2007 | Olsen |
| 7,280,046 B2 | 10/2007 | Berg |
| 7,283,904 B2 | 10/2007 | Benjamin |
| 7,286,917 B2 | 10/2007 | Hawkins |
| 7,286,929 B2 | 10/2007 | Staton |
| 7,289,024 B2 | 10/2007 | Sumcad |
| 7,289,035 B2 | 10/2007 | Nathan |
| 7,292,152 B2 | 11/2007 | Torkkola |
| 7,292,159 B2 | 11/2007 | Culpepper |

(56) References Cited

U.S. PATENT DOCUMENTS

| | | | |
|---|---|---|---|
| 7,298,248 B2 | 11/2007 | Finley | |
| 7,298,249 B2 | 11/2007 | Avery | |
| 7,301,445 B2 | 11/2007 | Moughler | |
| 7,317,383 B2 | 1/2008 | Ihara | |
| 7,317,392 B2 | 1/2008 | DuRocher | |
| 7,317,927 B2 | 1/2008 | Staton | |
| 7,319,848 B2 | 1/2008 | Obradovich | |
| 7,321,294 B2 | 1/2008 | Mizumaki | |
| 7,321,825 B2 | 1/2008 | Ranalli | |
| 7,323,972 B2 | 1/2008 | Nobusawa | |
| 7,323,974 B2 | 1/2008 | Schmid | |
| 7,323,982 B2 | 1/2008 | Staton | |
| 7,327,239 B2 | 2/2008 | Gallant | |
| 7,327,258 B2 | 2/2008 | Fast | |
| 7,333,883 B2 | 2/2008 | Geborek | |
| 7,339,460 B2 | 3/2008 | Lane | |
| 7,349,782 B2 | 3/2008 | Churchill | |
| 7,352,081 B2 | 4/2008 | Taurasi | |
| 7,355,508 B2 | 4/2008 | Mian | |
| 7,362,239 B2 | 4/2008 | Franczyk et al. | 340/936 |
| 7,365,639 B2 | 4/2008 | Yuhara | |
| 7,366,551 B1 | 4/2008 | Hartley | |
| 7,375,624 B2 | 5/2008 | Hines | |
| 7,376,499 B2 | 5/2008 | Salman | |
| 7,378,946 B2 | 5/2008 | Lahr | |
| 7,378,949 B2 | 5/2008 | Chen | |
| 7,386,394 B2 | 6/2008 | Shulman | |
| 7,397,363 B2* | 7/2008 | Joao | 340/539.11 |
| 7,421,334 B2 | 9/2008 | Dahlgren et al. | 701/117 |
| 7,433,889 B1 | 10/2008 | Barton | 707/104.1 |
| 7,447,509 B2 | 11/2008 | Cossins et al. | 455/457 |
| 7,474,264 B2 | 1/2009 | Bolduc et al. | |
| 7,474,269 B2 | 1/2009 | Mayer et al. | |
| 7,495,547 B2 | 2/2009 | Lich et al. | |
| 7,499,949 B2 | 3/2009 | Barton | 707/104.1 |
| 7,565,230 B2 | 7/2009 | Gardner et al. | 701/35 |
| 7,584,033 B2 | 9/2009 | Middelsteadt et al. | |
| 7,589,643 B2 | 9/2009 | Dagci et al. | 340/905 |
| 7,660,658 B2 | 2/2010 | Sheynblat | |
| 7,671,727 B2 | 3/2010 | Flick | |
| 7,671,752 B2 | 3/2010 | Sofer | |
| 7,697,917 B2 | 4/2010 | Camp et al. | |
| 7,739,036 B2 | 6/2010 | Grimm et al. | |
| 7,747,410 B2 | 6/2010 | Van Esch | |
| 7,783,406 B2 | 8/2010 | Rothschild | 701/93 |
| 7,821,421 B2 | 10/2010 | Tamir et al. | 340/901 |
| 7,859,392 B2 | 12/2010 | McClellan et al. | |
| 7,880,642 B2 | 2/2011 | Gueziec | 340/905 |
| 7,898,388 B2 | 3/2011 | Ehrman et al. | 340/5.8 |
| 7,941,258 B1 | 5/2011 | Mittelsteadt et al. | 701/35 |
| 8,044,809 B2* | 10/2011 | Farmer | 340/576 |
| 8,090,598 B2* | 1/2012 | Bauer et al. | 705/4 |
| 8,188,887 B2 | 5/2012 | Catten et al. | |
| 8,314,708 B2* | 11/2012 | Gunderson et al. | 340/576 |
| 8,428,307 B2 | 4/2013 | Bradai et al. | |
| 8,630,768 B2* | 1/2014 | McClellan et al. | 701/36 |
| 2001/0014849 A1 | 8/2001 | King et al. | |
| 2001/0018628 A1 | 8/2001 | Jenkins et al. | 701/35 |
| 2002/0019703 A1 | 2/2002 | Levine | |
| 2002/0024444 A1 | 2/2002 | Hiyama et al. | 340/576 |
| 2002/0029226 A1 | 3/2002 | Li et al. | |
| 2002/0111725 A1 | 8/2002 | Burge | |
| 2002/0126023 A1* | 9/2002 | Awada | 340/905 |
| 2002/0128000 A1 | 9/2002 | do Nascimento | |
| 2002/0173881 A1* | 11/2002 | Lash et al. | 701/1 |
| 2003/0016636 A1 | 1/2003 | Tari et al. | |
| 2003/0045273 A1 | 3/2003 | Pyhalammi et al. | |
| 2003/0052797 A1* | 3/2003 | Rock et al. | 340/936 |
| 2003/0055555 A1 | 3/2003 | Knockeart et al. | |
| 2003/0060950 A1 | 3/2003 | McKeown et al. | |
| 2003/0125854 A1 | 7/2003 | Kawasaki et al. | |
| 2003/0134660 A1 | 7/2003 | Himmel et al. | |
| 2003/0169185 A1 | 9/2003 | Taylor | |
| 2003/0191564 A1 | 10/2003 | Haugse et al. | |
| 2004/0039504 A1 | 2/2004 | Coffee et al. | |
| 2004/0054687 A1 | 3/2004 | McDonough | |
| 2004/0056779 A1 | 3/2004 | Rast | |
| 2004/0066330 A1 | 4/2004 | Knockeart et al. | |
| 2004/0077339 A1 | 4/2004 | Martens | |
| 2004/0083041 A1 | 4/2004 | Skeen et al. | |
| 2004/0107037 A1* | 6/2004 | Straub | 701/93 |
| 2004/0107220 A1 | 6/2004 | Natesan et al. | |
| 2004/0142672 A1 | 7/2004 | Stankewitz | |
| 2004/0153362 A1 | 8/2004 | Bauer et al. | |
| 2004/0172418 A1 | 9/2004 | Dorum et al. | |
| 2004/0176083 A1 | 9/2004 | Shiao et al. | |
| 2004/0186661 A1* | 9/2004 | Barton | 701/200 |
| 2004/0210353 A1 | 10/2004 | Rice | 701/1 |
| 2004/0225557 A1* | 11/2004 | Phelan et al. | 705/11 |
| 2004/0236474 A1 | 11/2004 | Chowdhary et al. | 701/1 |
| 2004/0236475 A1 | 11/2004 | Chowdhary | |
| 2004/0254698 A1 | 12/2004 | Hubbard et al. | 701/35 |
| 2004/0257245 A1 | 12/2004 | Jo | |
| 2004/0260579 A1 | 12/2004 | Tremiti | |
| 2005/0021270 A1 | 1/2005 | Hong et al. | |
| 2005/0064835 A1 | 3/2005 | Gusler | |
| 2005/0065711 A1 | 3/2005 | Dahlgren et al. | |
| 2005/0070245 A1 | 3/2005 | Nath et al. | |
| 2005/0091018 A1 | 4/2005 | Craft | |
| 2005/0091175 A9 | 4/2005 | Farmer | |
| 2005/0096809 A1 | 5/2005 | Skeen et al. | |
| 2005/0102098 A1* | 5/2005 | Montealegre et al. | 701/209 |
| 2005/0107944 A1 | 5/2005 | Hovestadt et al. | |
| 2005/0119002 A1 | 6/2005 | Bauchot et al. | |
| 2005/0131597 A1 | 6/2005 | Raz et al. | |
| 2005/0137757 A1 | 6/2005 | Phelan et al. | 701/1 |
| 2005/0143903 A1 | 6/2005 | Park et al. | |
| 2005/0171663 A1* | 8/2005 | Mittelsteadt et al. | 701/35 |
| 2005/0184860 A1 | 8/2005 | Taruki et al. | |
| 2005/0273218 A1 | 12/2005 | Breed et al. | |
| 2006/0025894 A1 | 2/2006 | Oconner et al. | |
| 2006/0055565 A1 | 3/2006 | Kawamata et al. | |
| 2006/0112573 A1 | 6/2006 | Hillman et al. | |
| 2006/0121951 A1 | 6/2006 | Perdomo et al. | |
| 2006/0154687 A1 | 7/2006 | McDowell | |
| 2006/0193749 A1 | 8/2006 | Ghazarian et al. | |
| 2006/0208169 A1 | 9/2006 | Breed et al. | |
| 2006/0220905 A1 | 10/2006 | Hovestadt | |
| 2006/0253307 A1 | 11/2006 | Warren et al. | |
| 2007/0005404 A1 | 1/2007 | Raz et al. | |
| 2007/0005609 A1 | 1/2007 | Breed | |
| 2007/0050130 A1 | 3/2007 | Grimm et al. | |
| 2007/0057781 A1 | 3/2007 | Breed | |
| 2007/0061155 A1 | 3/2007 | Ji et al. | |
| 2007/0126601 A1 | 6/2007 | Park | |
| 2007/0186923 A1 | 8/2007 | Poutiatine et al. | |
| 2007/0202929 A1 | 8/2007 | Satake | |
| 2007/0229234 A1 | 10/2007 | Smith | |
| 2007/0236342 A1 | 10/2007 | Hines et al. | |
| 2007/0260363 A1 | 11/2007 | Miller | |
| 2007/0293206 A1 | 12/2007 | Lund | |
| 2008/0027642 A1* | 1/2008 | Winberry et al. | 701/212 |
| 2008/0030316 A1* | 2/2008 | Flick | 340/466 |
| 2008/0046274 A1 | 2/2008 | Geelen et al. | |
| 2008/0059055 A1* | 3/2008 | Geelen et al. | 701/201 |
| 2008/0064413 A1 | 3/2008 | Breed | |
| 2008/0065325 A1 | 3/2008 | Geelen et al. | |
| 2008/0082225 A1* | 4/2008 | Barrett | 701/26 |
| 2008/0120175 A1 | 5/2008 | Doering | |
| 2008/0177469 A1 | 7/2008 | Geelen et al. | |
| 2008/0221787 A1 | 9/2008 | Vavrus | |
| 2008/0252487 A1 | 10/2008 | McClellan et al. | |
| 2008/0255722 A1 | 10/2008 | McClellan et al. | |
| 2008/0255888 A1 | 10/2008 | Berkobin | |
| 2008/0258890 A1* | 10/2008 | Follmer et al. | 340/439 |
| 2008/0262670 A1 | 10/2008 | McClellan et al. | |
| 2008/0296968 A1 | 12/2008 | Culbert | |
| 2008/0319602 A1 | 12/2008 | McClellan et al. | |
| 2009/0024273 A1 | 1/2009 | Follmer et al. | |
| 2009/0024419 A1 | 1/2009 | McClellan et al. | |
| 2009/0079555 A1 | 3/2009 | Aguirre De Carcer et al. | 340/441 |
| 2009/0085728 A1 | 4/2009 | Catten | |
| 2010/0030459 A1 | 2/2010 | Geelen et al. | |

(56) References Cited

U.S. PATENT DOCUMENTS

| | | | |
|---|---|---|---|
| 2010/0130182 A1 | 5/2010 | Rosen | |
| 2010/0131189 A1 | 5/2010 | Geelen et al. | 701/201 |
| 2010/0134182 A1 | 6/2010 | Kapoor et al. | |
| 2010/0207787 A1 | 8/2010 | Catten et al. | |
| 2010/0265074 A1* | 10/2010 | Namba et al. | 340/576 |
| 2011/0115618 A1 | 5/2011 | Catten | |
| 2011/0179080 A1* | 7/2011 | Miyazaki et al. | 707/772 |
| 2011/0267205 A1 | 11/2011 | McClellan et al. | |
| 2012/0181765 A1 | 7/2012 | Hill et al. | |

FOREIGN PATENT DOCUMENTS

| | | | |
|---|---|---|---|
| CA | 2631103 | 11/2008 | |
| DE | 197 00 353 A1 | 7/1998 | |
| EP | 0843177 | 5/1998 | |
| EP | 0 921 509 A2 | 6/1999 | G08G 1/01 |
| EP | 1811481 | 7/2007 | |
| GB | 2434346 | 7/2007 | |
| GB | 2454224 | 5/2009 | |
| JP | 2004326492 | 11/2004 | |
| JP | 2005-250825 | 9/2005 | |
| JP | 2007235530 | 9/2007 | |
| WO | WO 2004019646 | 3/2004 | |
| WO | WO 2005003885 | 1/2005 | |
| WO | WO 2005109273 | 11/2005 | |
| WO | WO2005109369 | 11/2005 | |
| WO | WO 2008045320 | 8/2008 | |
| WO | WO2008109477 | 9/2008 | |
| WO | WO 2013033756 | 3/2013 | |
| WO | WO 2013050548 | 4/2013 | |

OTHER PUBLICATIONS

Ogle, et al.; *Accuracy of Global Positioning System for Determining Driver Performance Parameters*; Transportation Research Record 1818; Paper No. Feb. 1063; pp. 12-24.

Shen, et al.; *A computer Assistant for Vehicle Dispatching with Learning Capabilities*; Annals of Operations Research 61; pp. 189-211, 1995.

Tijerina, et al.; *Final Report Supplement; Heavy Vehicle Driver Workload Assessment; Task 5: Workload Assessment Protocol*; U.S. Department of Transportation; 69 pages, Oct. 1996.

Myra Blanco; *Effects of In-Vehicle Information System (IVIS) Tasks on the Information Processing Demands of a Commercial Vehicle Operations (CVO) Driver*; 230 pages, 1999.

Zhu et al., "A Small Low-Cost Hybrid Orientation system and Its Error Analysis", Sensors Journal, IEEE—vol. 9, Issue 3, Digital Object Identifier: 10.1109/JSEN.2008.2012196; Publication Year: Mar. 2009, pp. 223-230.

Almazan et al., "Full auto-calibration of a smartphone on board a vehicle using IMU and GPS embedded sensors", Intelligent Vehicles Symposium (IV), 2013 IEEE; Digital Object Identifier: 10.1109/IVS.2013.6629658; Publication Year: Jun. 2013, pp. 1374-1380.

Lupton et al., "Efficient Integration of Inertial Observations Into Visual SLAM Without Initialization", Intelligent Robots and Systems, 2009, IROS 2009, IEEE/RSJ International Conference on: Digital Object Identifier: 10.1109/IROS.2009.5354267, Publication Year: Oct. 2009, pp. 1547-1552.

Mungula et al., "Attitude and Heading System Based on EKF Total State Configuration", Industrial Electronics (ISIE), 2011 IEEE International Symposium on; Digital Object Identifier: 10.1109/ISIE.2011.5984493; Publication Year: Jun. 2011, pp. 2147-2152.

Huddle et al., "Application of Inertial Navigation Systems to Geodetic Position and Gravity Vector Survey", Decision and Control including the 17th Symposium on Adaptive Processes, 1978 IEEE Conference on; vol. 17, Part 1; Digital Object Identifier: 10.1109/CDC.1978.267967; Publication Year: 1978, pp. 459-465.

Zhao Yan et al., "Attitude Measurement of Driver's Head Based on Accelerometer and Magnetoresistive Sensor", Fluid Power and Mechatronics (FPM), 2011 International Conference on; Digital Object Identifier: 10.1109/FPM.2011.6045836; Publication Year: Aug. 2011, pp. 613-617.

U.S. Appl. No. 11/805,237, Oct. 28, 2013, Notice of Allowance.

Phuyal B., "An Experiment for a 2-D and 3-D GPS/INS configuration for land vehicle applications", Position Location and Navigation Symposium, 2004, PLANS 2004, Digital Object Identifier: 10.1109/PLANS.2004.1308987; Publication Year: 2004, pp. 148-152.

Roberts et al., "Position Control of VTOL UAVs using IMU and GPS Measurements", Decision and Control and European Conference (CDC-ECC), 2011 50th IEEE Conference on, Digital Object Identifier, 10.1109/CDC.2011.6160854, Publication Year: Dec. 2011, pp. 8082-8087.

Cho et al., "Obeservability Analysis of the INS/GPS Navigation System on the Measurements in Land Vehicle Applications", Control, Automation and Systems, 2007, ICCAS '07, International Conference on Digital Object Identifier: 10.1109/CCAS.2007.4407018, Publication Year: Oct. 2007, pp. 841-846.

U.S. Appl. No. 11/805,238, Jul. 30, 2009, Office Action.
U.S. Appl. No. 11/755,556, Sep. 1, 2009, Office Action.
U.S. Appl. No. 11/779,176, Mar. 17, 2010, Office Action.
U.S. Appl. No. 11/805,238, Apr. 26, 2010, Notice of Allowance.
U.S. Appl. No. 11/755,556, May 4, 2010, Office Action.
U.S. Appl. No. 11/805,237, Nov. 8, 2010, Office Action.
U.S. Appl. No. 11/768,056, Jan. 18, 2011, Office Action.
U.S. Appl. No. 13/012,660, Feb. 16, 2011, Office Action.
U.S. Appl. No. 12/379,154, Aug. 1, 2008, Office Action.
U.S. Appl. No. 11/805,237, Aug. 8, 2011, Office Action.
U.S. Appl. No. 11/779,176, Aug. 18, 2011, Office Action.
U.S. Appl. No. 11/768,056, Sep. 16, 2011, Office Action.
U.S. Appl. No. 11/779,178, Nov. 2, 2011, Office Action.
U.S. Appl. No. 13/012,660, Nov. 14, 2011, Office Action.
U.S. Appl. No. 12/379,154, Jan. 30, 2012, Notice of Allowance.
U.S. Appl. No. 11/805,237, Feb. 1, 2012, Office Action.
U.S. Appl. No. 11/768,056, Feb. 16, 2012, Office Action.
U.S. Appl. No. 13/012,660, Apr. 11, 2012, Office Action.
U.S. Appl. No. 11/779,178, May 31, 2012, Office Action.
U.S. Appl. No. 11/805,237, Jun. 15, 2012, Office Action.
U.S. Appl. No. 11/768,056, Jul. 19, 2012, Office Action.
U.S. Appl. No. 13/012,660, Aug. 1, 2012, Office Action.
U.S. Appl. No. 13/012,660, Nov. 26, 2012, Office Action.
U.S. Appl. No. 11/805,237 Dec. 3, 2012, Office Action.
U.S. Appl. No. 11/779,176 Dec. 3, 2012, Office Action.
U.S. Appl. No. 11/779,178 Dec. 20, 2012, Office Action.
U.S. Appl. No. 13/012,660, Mar. 18, 2013, Office Action.
U.S. Appl. No. 11/779,178, May 9, 2013, Office Action.
U.S. Appl. No. 11/805,237, Jun. 6, 2013, Office Action.
U.S. Appl. No. 11/768,056, Jun. 21, 2013, Office Action.
U.S. Appl. No. 11/779,176, Jul. 1, 2013, Notice of Allowance.
U.S. Appl. No. 13/012,660, Jul. 8, 2013, Office Action.
U.S. Appl. No. 12/975,489, Oct. 3, 2013, Office Action.
U.S. Appl. No. 11/778,178, Feb. 6, 2014, Office Action.
U.S. Appl. No. 11/768,056, Feb. 6, 2014, Office Action.
U.S. Appl. No. 13/012,660, Feb. 13, 2014, Office Action.
U.S. Appl. No. 11/755,556, Jun. 10, 2014, Office Action.
U.S. Appl. No. 13/012,660, Jun. 6, 2014, Notice of Allowance.
U.S. Appl. No. 11/779,178, May 27, 2014, Notice of Allowance.

\* cited by examiner

SYSTEM AND METHOD FOR VIEWING AND CORRECTING DATA IN A STREET MAPPING DATABASE

TECHNICAL FIELD

The present invention relates generally to a system and method for creating, using and maintaining a database of street mapping data and, more particularly, to a system and method for updating street data and identifying errors in the database.

BACKGROUND

Detailed street mapping data is available from companies such as NavTeq and Tele Atlas. The street mapping data may include street location, street names, posted speed limits, numbers of lanes, travel direction, and other information. This street mapping data is used in vehicle navigation systems to provide map displays and other information to drivers. Typically, the only information displayed to a driver is a street map and limited other information, such as the name of the street being used by a vehicle and/or the name of the city or municipality in which the street is located. Other street mapping data may be available for a current street or roadway, but that information is not available to the driver. The street mapping data is used in some applications to evaluate driver performance, such as comparing vehicle speeds to posted speed limits recorded in the street mapping data. If the street mapping data is wrong, such as an incorrect posted speed limit, the driver will not know that a navigation system or vehicle monitoring system using the street mapping data may be using the wrong fundamental parameters to evaluate driver performance and/or vehicle operation. Furthermore, maintaining accurate mapping data can be a very costly endeavor.

SUMMARY OF THE INVENTION

These and other problems are generally solved or circumvented, and technical advantages are generally achieved, by preferred embodiments of the present invention in which street mapping data is available to a vehicle driver. The driver may then evaluate the accuracy of the street mapping data and may report errors in the street mapping data.

In one embodiment, a system and method for using street map data comprises broadcasting a warning to a driver, wherein the warning is triggered when a vehicle operating parameter does not comply with a limitation (e.g., a speed limitation, direction limitation, or otherwise) for a current street in a street mapping database; broadcasting the limitation for the current street to the driver; and receiving an indication that the limitation for the current street is incorrect. Broadcasting the warning to the driver may be providing an audible warning and/or a visual warning to the driver. Broadcasting the limitation for the current street to the driver may include displaying the limitation to the driver or playing a spoken message to the driver. The limitation may be a posted speed limit or a traffic direction, for example. The indication that the limitation is incorrect may be sent to a third party.

In another embodiment, a system and method for identifying errors in a street mapping database, comprises determining driving limitations for a current vehicle location; determining current operating parameters for a vehicle; identifying one or more current operating parameters that violate the driving limitations; broadcasting a warning to a vehicle driver, wherein the warning notifies the driver that one or more driving limitations have been violated; and displaying a stored value of the one or more driving limitations to the driver. The current vehicle location may be displayed to the driver on a map. Broadcasting a warning to a vehicle driver may include displaying a visual warning to the driver identifying one or more categories of driving limitations that have been violated. The one or more categories of driving limitations may be posted speed limits or traffic directions. The stored value may be a stored posted speed limit for the current vehicle location. An indication that the stored value is incorrect may be received, for example, from a driver, and the indication may be sent to a street mapping database provider and/or to a supervisor. For example, if an operator identifies an incorrect speed limitation value, such error can be communicated for purposes of correcting it. The database provider or supervisor, such as fleet manager, navigation system provider, or mapping data provider, may use the indication to evaluate or update a street map database. A replacement entry may be received for the stored value, for example, from a driver. The replacement entry may be sent to a street mapping database provider and/or a supervisor to evaluate or update a street map database.

In a another embodiment, a system and method for updating a street map database, comprises displaying a stored street use parameter to a driver, wherein the street use parameter is associated with vehicle operation on a street being used by the driver; and receiving a replacement value for the street use parameter from the driver. A street map database in a vehicle may be updated by replacing the stored street use parameter with the replacement value. A central street map database may be updated by replacing the stored street use parameter with the replacement value. The street use parameter may be selected from the group consisting of, for example, a speed limit, a traffic flow direction, a traffic signal status, a road condition, a traffic density, a road construction status, a street name, a municipality name, and a road hazard.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

The present invention provides many applicable inventive concepts that can be embodied in a wide variety of specific contexts. The specific embodiments discussed are merely illustrative of specific ways to make and use the invention, and do not limit the scope of the invention.

Figure 1:
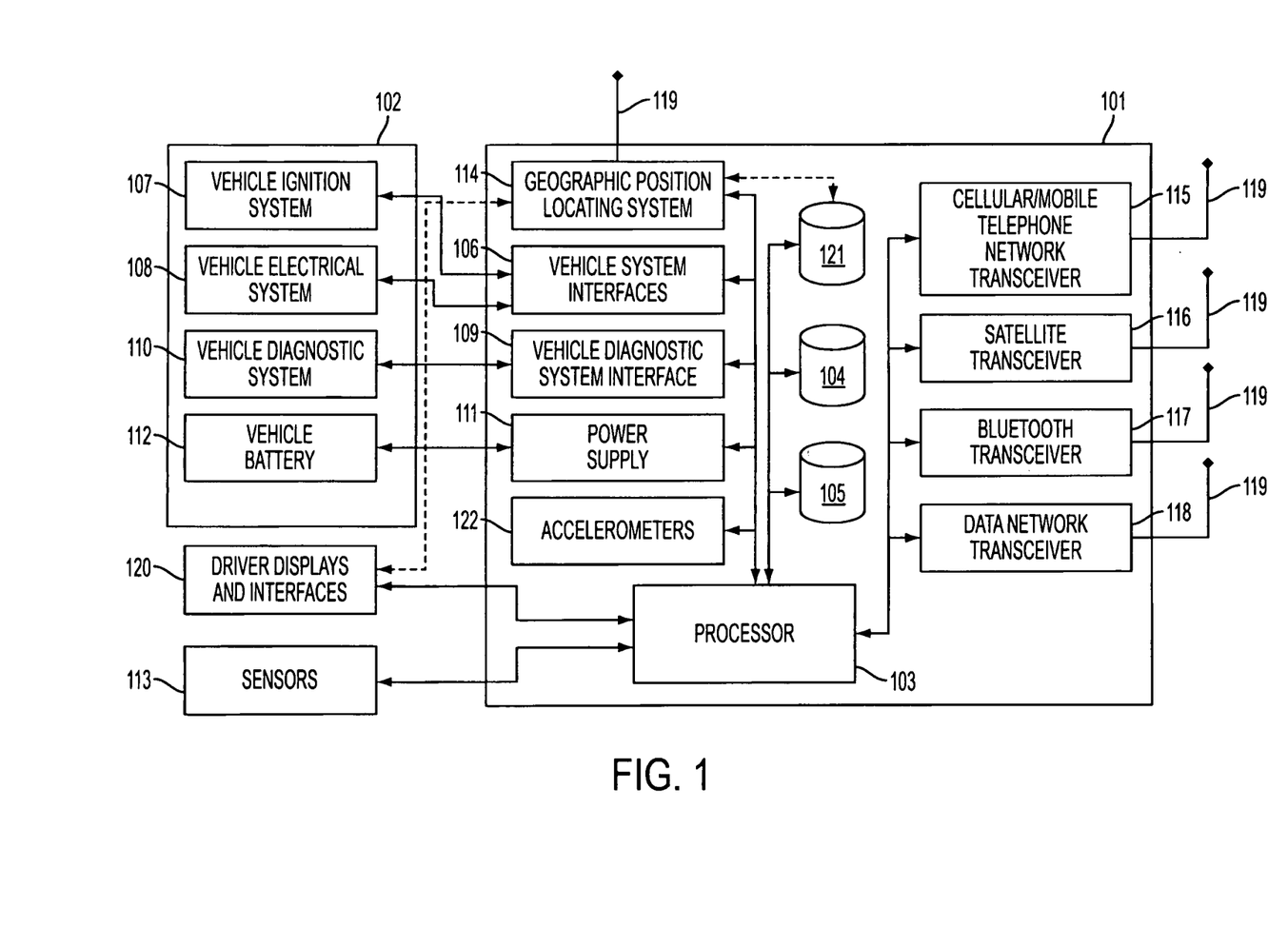
FIG. 1 is a high-level block diagram of a vehicle monitoring system according to one embodiment.

With reference to FIG. 1, there is shown vehicle monitoring unit 101 that is coupled to one or more systems in vehicle 102. Processor 103 controls the operation of monitoring unit 101.

Processor 103 may be a general use processing device having software designed to control unit 101. Alternatively, processor 103 may be a specially designed circuit or device, such as an application specific integrated circuit (ASIC), that is particularly designed for use in unit 101. Processor 103 may use firmware or software, such as an operating system, for control and operation. Operating firmware, software and other data may be stored in random access memory (RAM) 104, read only memory (ROM) 105, electrically erasable programmable memory (EEPROM) devices, or other storage devices, such as magnetic media.

Monitoring unit 101 includes one or more vehicle system interfaces 106 that allow unit 101 to interact with systems in vehicle 102, such as vehicle ignition system 107 and vehicle electrical system 108. Signals exchanged between interface 106 and vehicle ignition system 107 may allow monitoring unit 101 to determine the operating status of vehicle 102 and to command the ignition system to start or shutdown the engine of vehicle 102. Signals exchanged between interface 106 and vehicle electrical system 108 may allow monitoring unit 101 to determine the status of other vehicle systems and to command other systems to operate. For example, vehicle electrical system 108 may provide control of the vehicle's horn, interior and/or exterior lights, entertainment system, navigation system, heating and/or air conditioning systems, alarm, or other vehicle system.

Vehicle diagnostic system interface 109 provides a connection between monitoring unit 101 and vehicle diagnostic system 110. Vehicle diagnostic system 110 may be an on-board diagnostic (OBD) II system or a controller area network (CAN) system in vehicle 102 that is accessed via a port or data bus. The OBD/CAN system provides access to engine performance and status data, speedometer, odometer and tachometer data, and data from other vehicle systems. Power supply 111 provides power to monitoring unit 101. Power supply 111 may be a self-contained battery, for example, or it may be coupled to another power source, such as vehicle battery 112. There may be a connection between power supply 111 and vehicle battery 112 or power supply 111 may receive vehicle power via the vehicle's OBD/CAN bus, for example.

In addition to vehicle sensors and diagnostic systems, such as OBD/CAN 110, monitoring unit 101 may be coupled to other original equipment and aftermarket sensors 113 in vehicle 102. For example, monitoring unit 101 may be coupled an RF transmission sensor, which is configured to detect transmissions such as cellular voice and data signals that originate from or are received at vehicle 102, such as the sensors described in U.S. patent application Ser. No. 11/866,247, entitled "System and Method for Detecting Use of a Wireless Device in a Moving Vehicle," filed Oct. 2, 2007, the disclosure of which is hereby incorporated herein by reference in its entirety. Other sensors may include, for example, seatbelt use sensors, alcohol or ethanol vapor sensors, cameras, microphones, accelerometers, adaptive control devices, angular acceleration sensors, traction control, ABS, or crash detectors.

Monitoring unit 101 further includes geographic position locating system 114, which provides location information for vehicle 102, such as a latitude/longitude, street address, or map coordinates, for example. In one embodiment, geographic position locating system 114 may be a global positioning system (GPS) that uses satellite signals to determine location. Other navigation or location-determining systems may also be used, such as inertial navigation systems that update a vehicle's location as it moves from a known position or terrestrial-based radio navigation systems, such as Long Range Aid to Navigation (LORAN). In other embodiments, position locating system 114 may use transmissions or data from cellular or wireless network towers to determine a geographical location.

Monitoring unit 101 may include one or more systems that provide communications with other devices and systems. For example, monitoring unit 101 may include cellular or mobile telephone transmitter/receiver 115 that allows unit 101 to communicate with other devices and to send or receive data via a cellular or mobile network. Satellite transmitter/receiver 116 allows unit 101 to communicate with other devices and to send or receive data via satellite network communications. Bluetooth transmitter/receiver 117 allows unit 101 to communicate with other devices that have Bluetooth capability. Data network transmitter/receiver 118 allows unit 101 to communicate via networks, such as data communication networks using WiFi, IEEE 802.11, WiMAX, or other standards or protocols, for example. Monitoring unit 101 may further include one or more antennas 119 to support such communications. Antennas 119 may be internal to monitoring unit 101, may be formed as an integral part of a housing for unit 101, may be externally mounted on vehicle 102, or may be embodied in any antenna configuration now known or later developed.

Vehicle monitoring unit 101 may also be used to provide information, such as vehicle status or location, to a driver and passengers in vehicle 102 using driver displays and interface 120. For example, processor 103 may be configured to identify alarm conditions, such as when vehicle 102 is operated outside of preselected conditions, and to provide feedback or alarms to the driver. Upon detection of an alarm condition, processor 103 may present a warning to the driver, such as text messages, alarm horn, audible tone or message, or a visual warning via driver displays and interface 120. Driver displays and interface 120 may include, for example, speakers, horns, warning lights, keypads, graphics, text or image display screens, or touch-screen displays. Possible displays may include the vehicle's OEM equipment.

Driver displays and interface 120 may also provide position and routing data to the driver, such as street maps, maps of current or destination locations, suggested or actual routes, vehicle heading, vehicle speed, estimated trip duration, predicted destination arrival time, points of interest, and the like. The position and routing information may be provided to driver display and interface 120 from processor 103 or from geographic position locating system 114, for example. Vehicle monitoring unit 101 may further include street mapping database 121 for use with geographic position locating system 114 and/or processor 103. For example, street mapping database 121 may include street maps for multiple locations and street data for specific streets, such as posted speed limits, lane number and direction, road conditions, and traffic conditions. The data in street mapping database 121 may be stored in a compact disc (CD), digital video disc (DVD), random access memory, read only memory, electrically erasable programmable memory, or other magnetic media or electronic storage.

In other embodiments, street mapping database 121 may be stored in RAM 104 or ROM 105, or in geographic position locating system 114. In one embodiment, geographic position locating system 114 or processor 103 determine a current location of vehicle 102 and use data from street mapping database 121 to display a map of the current location to the driver via displays and interfaces 120, such as the current street on which vehicle 102 is driving. Additional information may be presented to the driver, such as a street name, driving direction, posted speed limit, expected traffic conditions, or the like.

In one embodiment, the street mapping information stored in database 121 may be updated, for example, by the driver or a third party. The driver may enter data, such as updated traffic or construction information, updated posted speed limits, street names, or street closures, via driver interfaces 120. Alternatively, or additionally, monitoring device 101 may receive updated street mapping data, such as via a wireless transmissions received by one or more of transceivers 115-118, from a third party, such as monitoring service operator, street mapping data provider, fleet manager, or other person or entity.

Vehicle monitoring unit 101 may also include accelerometer module 122, which includes at least one accelerometer for measuring at least one of lateral (sideways), longitudinal (forward and aft) and vertical acceleration, for determining whether the driver is operating vehicle 102 in an unsafe or aggressive manner. For example, excessive lateral acceleration may be an indication that the driver is operating vehicle 102 at an excessive speed in a turn. Excessive lateral acceleration, defined herein as "hard turns," may be indicative of aggressive driving by the driver and may contribute to excessive wear on tires and steering components as well as potentially causing the load such as a trailer to shift and potentially overturn. Additionally or alternatively, accelerometers 122 may include a self-contained and tamper-resistant event data recorder or crash data recorder (CDR) similar to that which is shown and disclosed in U.S. Pat. Nos. 6,266,588 and 6,549,834 issued to McClellan et al., (the disclosures of which are hereby incorporated by reference herein in their entirety) and which is commercially known as "Witness" and commercially available from Independent Witness, Inc. of Salt Lake City, Utah. The CDR is adapted to continuously monitor vehicle motion and begin recording upon supra-threshold impacts whereupon it records the magnitude and direction of accelerations or G-forces experienced by the vehicle as well as recording an acceleration time-history of the impact event and velocity change between pre- and post-impact for a configurable duration following an impact. In one embodiment, the recordings are time-date stamped and are available to processor 103 for subsequent transmission to a supervisor or central monitoring facility if vehicle accelerations exceed an impulse threshold. Such accelerometers and CDRs are described in U.S. patent application Ser. No. 11/805,238, entitled "System and Method for Monitoring and Updating Speed-by-Street Data," filed May 22, 2007, the disclosure of which is hereby incorporated herein by reference in its entirety.

Figure 2:
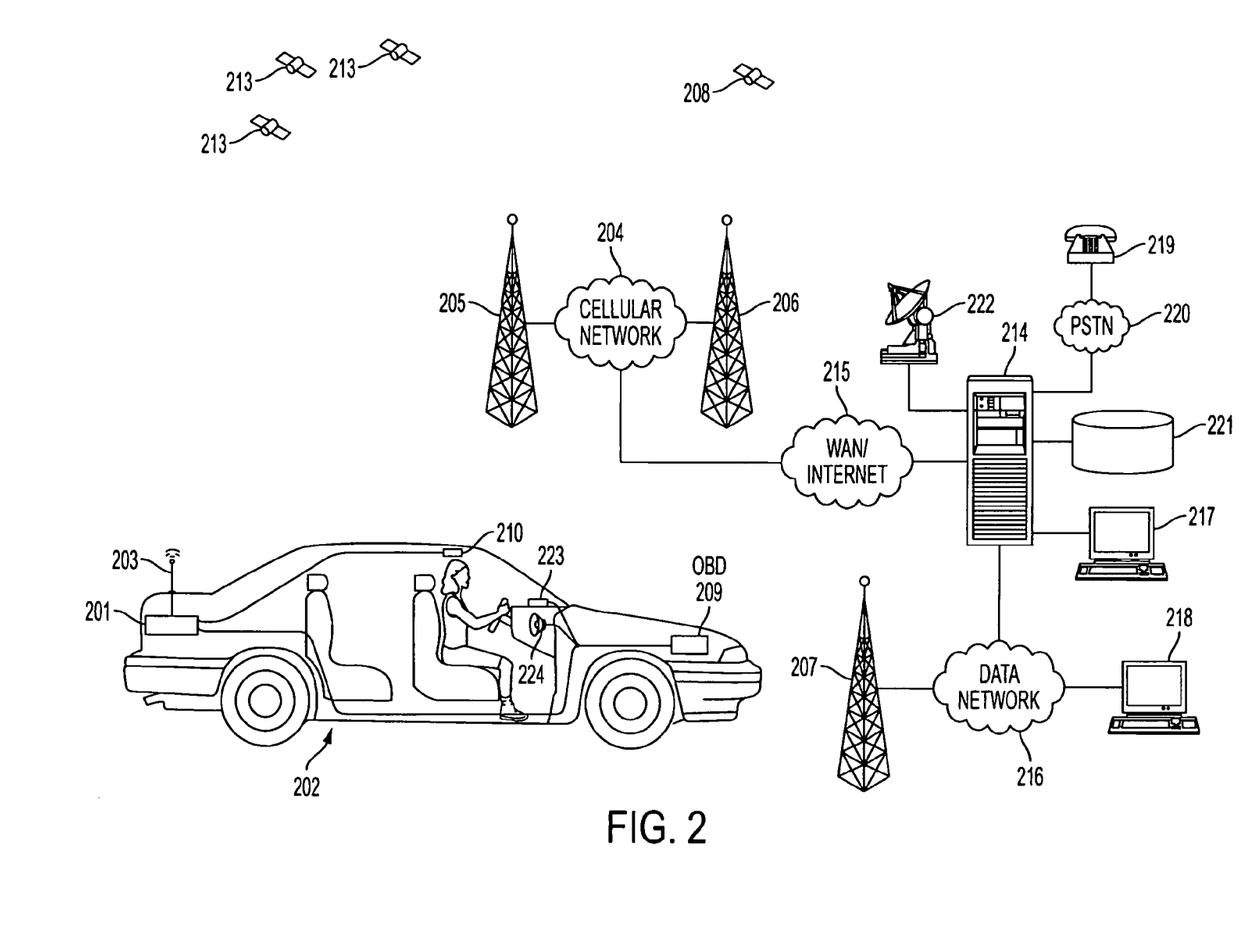
FIG. 2 is a high-level block diagram of a system for detecting wireless device usage in moving vehicles.

FIG. 2 illustrates monitoring unit 201 installed or mounted in vehicle 202. Monitoring unit 201 may include the elements of monitoring unit 101 and may be coupled to systems in vehicle 202 as illustrated, for example, in FIG. 1. Monitoring unit 201 may be mounted in any location within vehicle 202, such as in a trunk, under a seat, in a glovebox, or on a window or dashboard. Monitoring unit 201 is coupled to one or more antennas 203, which may be used to communicate with one or more satellite or terrestrial communications networks. Monitoring unit 201 may be capable of communicating with one or more networks or systems, such as cellular or mobile telephone network 204, having base stations or cell sites 205 and 206, wireless data network 207, such as a Bluetooth, WiFi, WiMAX or 802.11 network, or satellite 208. Monitoring unit 201 may also be in communication with or receive signals from satellites 213, which may be part of a geographical position locating system, such as a GPS system.

Monitoring unit 201 is coupled to and in communication with on board diagnostic system 209 in vehicle 202. Vehicle monitoring unit 201 has access to certain vehicle operating parameters including, but not limited to, vehicle speed such as via the speedometer, engine speed or throttle position such as via the tachometer, mileage such as via the odometer reading, seat belt status, condition of various vehicle systems including anti-lock-braking (ABS), turn signal, headlight, cruise control activation, adaptive cruise control, traction control, and a multitude of various other diagnostic parameters such as engine temperature, brake wear, and the like. Monitoring unit 201 may also be coupled to driver displays and interfaces, such as warning lights or touch-screen display 223 and/or speaker 224. Monitoring unit 201 may also be coupled to additional sensors 210, such as an RF sensor, camera, microphone, ethanol vapor sensor or the like.

Server 214 may be any processor-based system that is capable of communicating with external networks and processing data associated with wireless device usage and vehicle monitoring units. Server 214 may be coupled to multiple networks, such as cellular network 204 or wireless data network 207, via networks 215 and 216, which couple server 214 to other communication networks, may be any public or private data network, such as an Internet, intranet, extranet, or wide or local area network (WAN/LAN). Server 214 may be coupled to satellite 208 via antenna 222. In one embodiment, users may communicate with server 214 via a local or remote personal computer (PC), laptop computer, or terminal, such as devices 217 or 218. Alternatively, server 214 may communicate with users via a wireless device (not shown) or a wireline connection, such as telephone 219, using, for example, voice signals, an interactive voice response (IVR), a voice response unit (VRU), or dual tone multi-frequency (DTMF) tones. Telephone 219 may be coupled to public switched telephone network (PSTN) 220.

Memory 221 may be used to store information, such as user account data, vehicle data, vehicle monitoring unit information, or street mapping data. Server 214 may access data stored on memory 221 and may store data to memory 221. Users may access memory 221, for example, to enter, update, or edit account data, via terminals or computers 217 and 218. Memory 221 may be internal or external to server 214 and may be located near to or remote from server 214. Communication between monitoring unit 201 and server 214 may be via cellular network 204, data network 207 and/or communication satellite network 208 depending upon availability of each network, the urgency of the message, and/or user configuration.

Vehicle monitoring unit 201 may transmit reports to server 214, such as driving conditions, vehicle operation parameters, or violations of operating requirements or limitations. Server 214 may then take action to record, report and/or mentor this behavior. For example, a user may configure server 214 to take certain action upon detecting that vehicle 202 is speeding. Server 214 may command monitoring unit 201 to broadcast warnings, such as audible messages or tones or visual lights or text, to the driver of vehicle 202. Additionally, server 214 may report the wireless device use to the driver's parent, supervisor, fleet manager or other authority. Such vehicle operation violations may trigger any number of actions preselected by the user and/or default actions in server 214.

The user may configure server 214 to send warning feedback to vehicle 202 upon detection of a potentially unsafe driving condition, such as speeding, driving the wrong way, or other conflicts with street mapping data. Such messages may warn the driver of the type of violation and/or direct the driver to discontinue the action or violation. Server 214 may take further action to warn or mentor the driver, notify a supervisor, or otherwise document the event as appropriate. Server 214 may also provide a report or notification to a supervisor or authority of the potentially unsafe driving conditions, such as by calling a fleet manager or parent via telephone 219 or by sending an email or text message to the supervisor.

Driver performance may be measured using vehicle monitoring equipment that is installed in a vehicle and collects information, such as the vehicle's speed, acceleration, and location. The unit may capture data identifying where the vehicle is driven, when the vehicle is driven, and how the vehicle is driven (i.e. driver performance). One embodiment of a vehicle monitoring unit is described in U.S. patent application Ser. No. 11/805,237, entitled "System and Method for Monitoring Vehicle Parameters and Driver Behavior," filed May 22, 2007, the disclosure of which is incorporated by reference herein in its entirety. The vehicle monitoring unit may receive inputs from internal and external sources and sensors such as accelerometers, geographic position locating systems, global positioning systems (GPS), vehicle on-board diagnostic systems, seatbelt sensors, wireless device, or cell phone use detectors, alcohol vapor detectors, or trans-dermal ethanol detection. The vehicle monitoring unit may be used to evaluate and grade driver behavior, as described in U.S. patent application Ser. No. 11/755,556, filed on May 30, 2007, entitled "System and Method for Evaluating Driver Behavior," the disclosure of which is hereby incorporated by reference herein in its entirety. The vehicle monitoring unit may also be used to provide feedback and mentoring to the driver in order improve the driver's performance and driving behavior, such as described in U.S. patent application Ser. No. 11/768,056, filed on Jun. 25, 2007, entitled "System and Method for Monitoring and Improving Driver Behavior," the disclosure of which is hereby incorporated by reference herein in its entirety.

In one embodiment, vehicle monitoring unit 101 (FIG. 1) may evaluate a driver's performance based upon the operation of vehicle 102 compared to data in street mapping database 121. For example, the speed of vehicle 102 may be compared to posted speeds, road conditions, or traffic conditions stored in street mapping database 121, or the heading of vehicle 102 may be compared to traffic direction data stored in street mapping database 121. If vehicle monitoring unit 101 detects a violation of an operating parameter, then the vehicle monitoring unit may broadcast a warning or other feedback to the driver. In one embodiment, if a vehicle speed that is more than a posted speed stored in street mapping database 121, then a speeding warning is broadcast to the driver. In another embodiment, if a vehicle speed that is too fast for an expected road or traffic condition stored in street mapping database 121, then an audible and/or visual warning or other mentoring feedback may be broadcast to the driver. In another embodiment, if vehicle 102 is driving on a street in the wrong direction compared to a driving direction stored in street mapping database 121, then another audible and/or visual warning or other mentoring feedback may be broadcast to the driver. In addition to such driver warnings, reports or notification may be sent to third parties, such as a supervisor, fleet manager, or parent.

In known driver warning and feedback systems, when a driving violation or alert condition is detected, an audible and/or visual warning is broadcast to the driver noting the type of violation, such as speeding, but the underlying data that triggers the alert is not presented to the driver. For example, if a posted speed of 45 MPH is stored in a street mapping database for a particular street, and a vehicle is traveling at 50 MPH on that street, then the vehicle monitoring unit may broadcast an audible and/or visual speeding warning to the driver and may instruct or recommend to the driver to reduce speed. However, in known driver warning and feedback systems, the vehicle monitoring unit does not identify the underlying data to the driver, such as the posted speed limit stored in the street mapping database. In the example above, when the vehicle monitoring unit determines that the vehicle speed is greater than a posted speed limit stored in a street mapping database, a warning is broadcast, but neither the posted speed limit nor the amount of the violation—such as a number of miles-per-hour or a percentage that the actual speed is exceeding a posted speed limit in the database—are presented to the driver. Accordingly, if the posted speed limit data in the street mapping database is in error, then the driver will be improperly warned or reported for a speeding violation.

Figure 3:
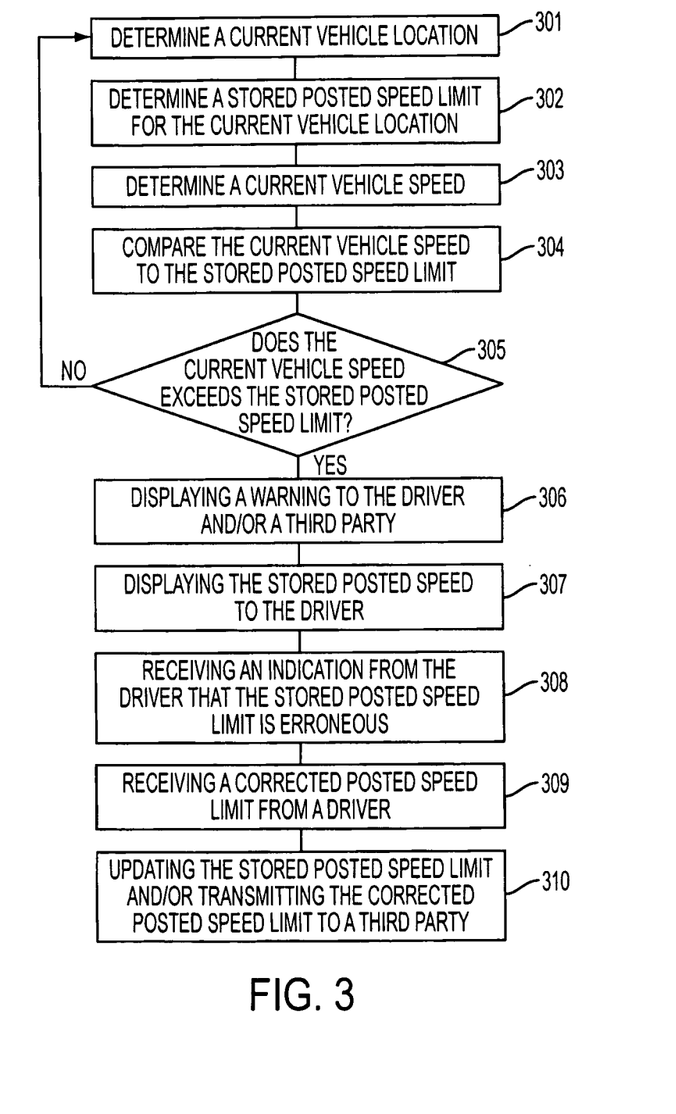
FIG. 3 is a flowchart illustrating a method according to one embodiment described herein.

FIG. 3 illustrates a flowchart for an exemplary embodiment of a method for using street mapping data. The method illustrated in FIG. 3 may be implemented, for example, using vehicle monitoring unit 101 or 201, but is not intended to be limited to such configurations. Moreover, it will be understood that the steps illustrated in FIG. 3 may be performed in the order indicated, or in any other order, or simultaneously, or in conjunction with other steps or methods. In step 301, a vehicle's current location is determined. The vehicle's location may be determined using, for example, a geographic position locating system, a satellite-based positioning system, a GPS, or a vehicle monitoring unit. The vehicle location may be associated with specific street or roadway. In step 302, a stored posted speed limit for the vehicle's current location is determined. The stored posted speed limit may be retrieved from a street mapping database, such as database 121 (FIG. 1), using the current vehicle location. The stored posted speed limit may be a speed limit for a street or roadway on which the vehicle is traveling. In step 303, the current speed of the vehicle is determined. The vehicle's speed may be determined, for example, using a vehicle monitoring unit, a GPS, a vehicle navigation system, a vehicle speedometer, or determined from data collected from a vehicle on-board diagnostic system. In step 304, the vehicle's current speed is compared to the stored posted speed limit. In step 305, an evaluation is made to determine if the current vehicle speed exceeds the stored posted speed limit.

If the current vehicle speed is at or below the stored posted speed limit, then the process returns to step 301. If the current vehicle speed is above the stored posted speed limit, then the process moves to step 306 in which a warning is displayed to the driver. Alternatively, or additionally, a warning or notice may be sent to a third party, such as a fleet manager, parent, supervisor, or other authority. The driver warning may be a visual display and/or an audible message, horn or other noise and/or in conjunction with a tactile alert. In step 307, the stored posted speed is displayed to the driver. If the driver believes that the stored posted speed is incorrect, then in step 308, the driver may send an indication that the stored posted speed limit is erroneous. The indication from the driver may be, for example, a signal or input to the driver interface 120 (FIG. 1) that identifies a correct or current posted speed limit (step 309), or merely a signal or input that the stored posted speed limit is incorrect. In one embodiment, if a vehicle monitoring unit displays a speeding violation warning to the driver, and the driver believes that he is driving at or under the speed limit, then the driver can compare the displayed stored posted speed limit with an actual observation of a posted speed limit on the street or roadway. The driver may input the correct speed limit into the unit, or the driver may press a button, for example, on vehicle monitoring unit 101 or 201, to indicate that a speeding warning is erroneous. In step 310, the stored posted speed limit may be updated. For example, a stored posted speed limit in database 121 (FIG. 1) may be updated. In another embodiment, the corrected posted speed limit may be transmitted to a third party, such as a service provider for use in updating a master database. In the alternative, the driver may be exceeding the actual posted speed and notice that the device is not alerting them to the speed overage. The device may display an erroneously high speed in which case the driver may depress a button or other possible alert mechanisms so that the speed limit database may be updated.

Figure 4:
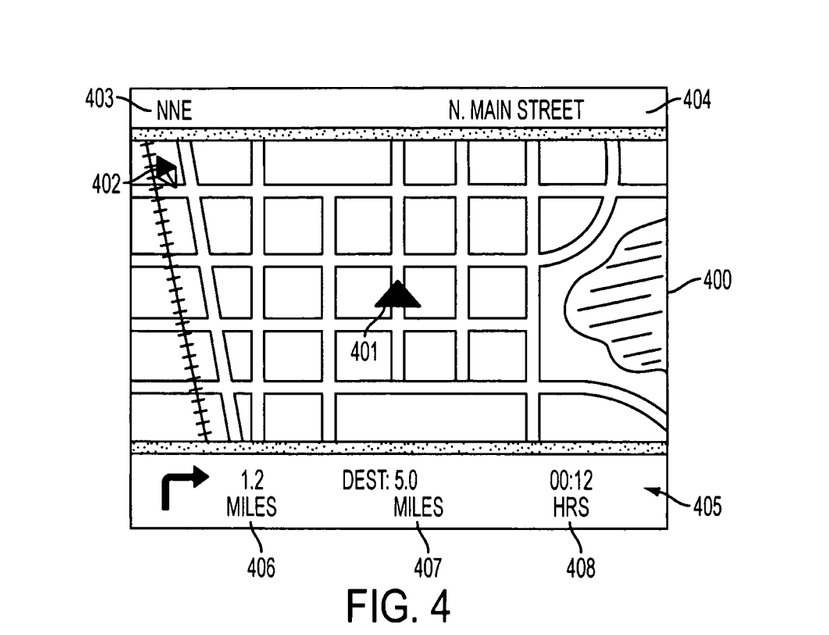
FIG. 4 illustrates one embodiment of a street mapping data display.

FIG. 4 illustrates one embodiment of a street mapping display that may be used, for example, to display vehicle location information to a driver. Display 400 may be used, for example, in connection with a GPS or other geographic position locating system to display vehicle location information. Vehicle location is shown by icon 401 located in the middle of display 400. Streets, railroad tracks, rivers, lakes, and other geographic features are displayed on display 400. Heading information may be displayed, for example, using compass 402, which points to North, or using heading direction 403, which displays an approximate or exact vehicle heading. A current street name 404 may also be displayed to the driver. Other current location information, such as a city or county name, may also or additionally be displayed. Routing information 405 may be shown on display 400, such as upcoming turn warning 406, distance to destination 407, and time to destination 408. As is well known, other location, route and destination information may be displayed, such as a turn list or maneuver list for a selected route, an elapsed route timer, alternate routing options, display zoom and pan controls, and current vehicle speed display. In the event that the system has a display, listing the posted speed limit as well as the vehicle's actual speed and/or the differential is desirable. The displayed information may also be provided to the driver in an audible format, such as a spoken message that recites a current street, current city, upcoming turn or routing directions, or warnings.

Figure 5:
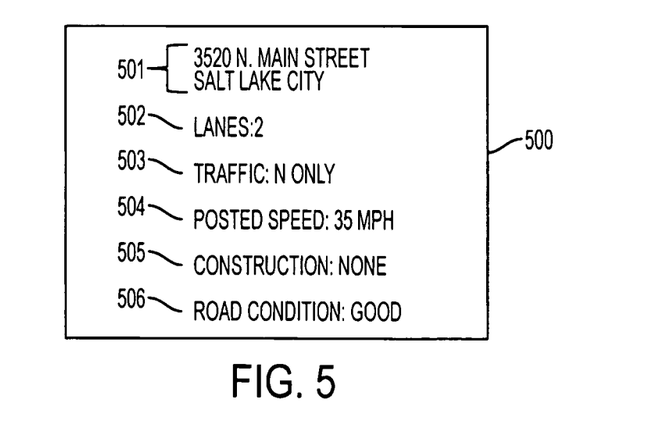
FIG. 5 illustrates another embodiment of a street mapping data display.

Display 400 illustrates the typical information provided in a GPS display. However, additional data may be available from a street mapping database, such as posted speed limits, normal traffic direction, expected traffic conditions, or traffic restrictions. This additional information is not provided to the driver in known GPS or navigation systems. FIG. 5 illustrates additional information that may be provided to a driver. Display 500 provides current location 501, which may be a current street address, city, latitude/longitude, and/or other geographic location or coordinates. Other information for the current street, road or other thoroughfare may be displayed, such as the number of traffic lanes 502, a traffic direction 503, which may designate if a street, lane or other portion of a street is two-way, one-way, and/or what direction traffic normally flows. The posted speed limit 504, known construction conditions 505, and general road condition 506 may also be displayed. The street mapping data shown in display 500 may be obtained by querying a vehicle-based street mapping database, such as database 121 (FIG. 1), or retrieved wirelessly from an external database, such as database 221 (FIG. 2).

In one embodiment, the street mapping data may be used to evaluate driver behavior and performance, such as to detect speeding conditions. For example, when the vehicle's current speed exceeds the posted speed limit that is stored in the street mapping database for the current location, a warning may be issued to the driver. Additionally or alternatively, a notice may be sent to a third party when a speeding or other violation occurs. A grace period, such as a number of seconds or minutes, may be used before reporting the violation to a third party in order to allow the driver to correct the violation and thereby avoid third-party notification.

Figure 6:
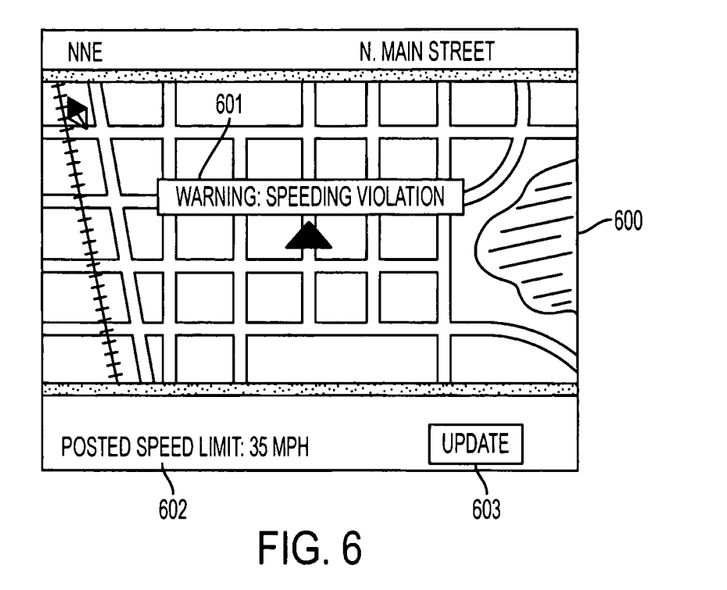
FIG. 6 illustrates a further embodiment of a street mapping data display.

FIG. 6 illustrates one embodiment of a driver display during a violation, such as exceeding a posted speed limit. Display 600 includes visual warning notice 601 that may overlay or replace the usual location information. Warning notice 601 may be accompanied by or replaced by an audible alarm, horn, tone, or recorded or spoken message. Warning notice 601 preferably identifies a violated parameter, such as a posted speed limit or street travel direction. Additional violation information 602 may be presented to the user. For example, the posted speed limit and/or current vehicle speed may be displayed during a speeding violation condition. Due to data entry error, changes in signage, or temporary road conditions, the actual posted speed limit on the street may be different than the stored posted speed limit in the street mapping database. For example, if the posted speed limit data that is stored in the street mapping database was entered as 35 MPH, but the actual posed speed limit is 45 MPH, then the driver will be warned of a speeding condition while driving at a legal speed between 36 MPH and 45 MPH. Existing navigation systems do not provide users with the capability to correct or report such errors. In one embodiment, display 600 provides the driver with an option, such as update button 603, to enter correct data or to report errors.

Figure 7:
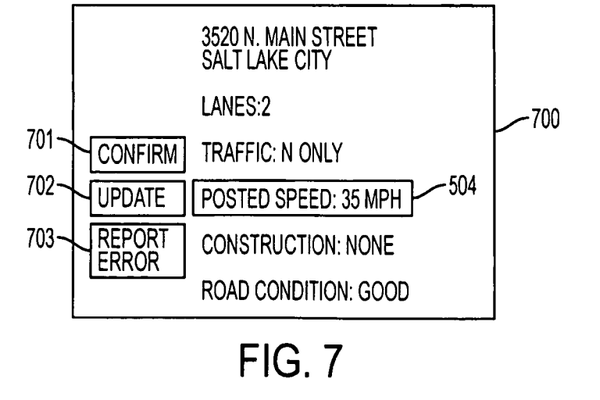
FIG. 7 illustrates an alternative embodiment of a street mapping data display.

FIG. 7 illustrates a data correction and/or error reporting display 700. In one embodiment, the driver may select update button or feature 603 to cause display 600 to change to display 700. Displays 400, 500, 600, 700 may be touch screens that allow a user to select features, such as 603, by touching the feature. Alternatively, the user may highlight or otherwise selecting the feature using buttons or switches external to the display or using other inputs to the display, such as a cursor or other highlighting tool. Display 700 displays the stored street mapping data to the driver and allows the driver to identify and report errors and to confirm correct entries in the street mapping data. Like display 500, the street mapping data shown in display 700 may be obtained by querying a vehicle-based street mapping database, such as database 121 (FIG. 1), or retrieved wirelessly from an external database, such as database 221 (FIG. 2).

In one embodiment, the posted speed data 504 may be highlighted or otherwise selected automatically or manually in display 700. Options 701-703 may be provided to the driver. Confirm option 701 may be selected by the driver to confirm that the stored posted speed limit data 504 in the street mapping database is correct. Update option 702 may be selected by the user to initiate a procedure to enter corrected posted speed limit data. For example, after selecting update feature 702, the driver may be presented with a screen or field in which the correct posted speed may be entered. The corrected data may then be used to update or evaluate the street mapping database. Report error option 703 may be used to send a notice to a third party, such as a fleet manager, navigation system manufacturer, or street mapping data provider, that identifies the posted speed limit error. Report error 703 may be used to simply identify that an error may be present or to enter a corrected posted speed limit.

The third party may use the reported error information in a number of ways, such as collecting error reports from a plurality of drivers until the number of error reports for a particular data entry reach a preselected level. For example, instead of correcting the street mapping data after one error report, the third party may conduct a visual inspection of the location to verify the posted speed limit before editing the street mapping database. Alternatively, the third party may wait until multiple drivers report the error before correcting the database, such as waiting for 25, 50 or 100 error reports or some other number of statistically significant error reports from different drivers or vehicles before the posted speed limit stored in the street mapping is changed or updated. This would allow the third party to identify "hot spots" of frequent error reports. The third party may be, for example, a monitoring service operator, street mapping data provider, fleet manager, or other person or entity that is responsible for maintaining the street mapping database. Additionally, individuals that report database speed errors may have their system adjusted to a temporary higher speed limit until the speed database error can be assessed and corrected if necessary. At that point the temporary speed adjustment would default the database speed. Each reported speed inaccuracy would also be reported to track potential excessive or fraudulent speed database errors.

It will be understood that displays 500 and 700 may be available at anytime and not just during warning conditions. For example, a user may highlight or select vehicle icon 401 or street name 404 (FIG. 4) to request street mapping data 700. Once the street mapping data display 700 is shown, the driver may review the data and verify the data or correct or report errors in the data. Additionally, it will be understood that the correctable or reportable errors are not limited to posted speed limits, but that any street mapping database field may be reviewed and corrected using the embodiments described herein. Moreover, other warnings may also be provided to the driver. For example, if the street mapping data shows that a particular street is configured for one-way traffic in a southern direction, and the vehicle is traveling northbound on that street, then a warning may be provided to the driver, similar to what is shown in display 600 (FIG. 6). The warning may display "Warning: Traffic Direction," for example. If the driver believes that the warning is in error, the driver may select display 500 or 700 to view and possibly correct traffic direction 503.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. In an on-board vehicle monitoring system that monitors and reports real-time driving violations to a driver of a vehicle in order to assist the driver in knowing when a violation is occurring, a method of permitting the driver to identify perceived errors in reported violations which are monitored while driving the vehicle, comprising:

detecting at a plurality of sensors installed in a vehicle parameters from which data is derived that defines the following information: i) where the vehicle is being driven, ii) date and time as to when the vehicle is being driven, iii) road conditions, iv) how the vehicle is being operated, v) whether vehicle equipment is being correctly used, and vi) one or more driver behaviors that are related to safe driving behaviors;

inputting to an on-board vehicle monitoring system which comprises system memory and one or more processors for data processing, i) the detected parameters from said plurality of sensors installed in the vehicle, ii) thresholds which define criteria against which the detected parameters are evaluated and iii) identification information for the driver of the vehicle;

the on-board vehicle monitoring system evaluating the input detected parameters by performing the following computer-implemented data processing:

determining a particular date, time and street where the vehicle is traveling; and determining from the input parameters and the thresholds whether one or more of the following violations is occurring: the vehicle is being operated in an unsafe manner, the driver of the vehicle is engaging in unsafe behavior, or vehicle equipment is failing to be properly utilized or is being improperly utilized;

the on-board vehicle monitoring system broadcasting a warning to the driver when a violation is determined to occur;

the on-board vehicle monitoring system identifying the particular type of violation for which said warning is broadcast to the driver so that the driver is aware of the type of violation;

in response to said broadcast warning, and in response to an observation by the driver that the broadcast warning is inconsistent with actual driving conditions, at the on-board vehicle monitoring system, activating in response to a single driver input a real-time error indication that said broadcast warning issued by the vehicle monitoring system to the driver of the vehicle is an error based on the vehicle driver's observation of the actual traffic conditions or vehicle operation; and so that the most current parameters are used to evaluate the driver, in response to said activation by the driver of said error indication, the vehicle monitoring system storing in system memory the data for the error indication, including storing at least the following for each particular type of violation for which an error indication was input by said driver:

identification of the vehicle, identification of the driver, a particular street location, the date and time the vehicle was traveling on the particular street, and the detected parameters giving rise to said particular type of violation for which an error indication was input by said driver.

2. The method of claim 1, wherein broadcasting the warning to the driver comprises broadcasting at least one of an audible warning to the driver and a visual warning to the driver.

3. The method of claim 1, wherein identifying the particular type of violation for which said warning is broadcast comprises including an indication of a limitation for the street on which the driver is traveling, which comprises advising the driver of a posted speed limit.

4. The method of claim 1, wherein broadcasting the warning and identifying the particular type of violation for which said warning is broadcast comprises playing a spoken message to the driver.

5. The method of claim 1, wherein the identified violation is based on at least one of the following: use of a cell phone while driving, improper use of vehicle equipment, or failure to use vehicle equipment.

6. The method of claim 1, wherein the identified violation is a traffic direction.

7. The method of claim 1, further comprising transmitting the data for the error indication to a third party.

8. The method of claim 1, further comprising sending to a central server or database said data for the error indication in order to enable evaluation of the driver using the most current parameters.

9. One or more hardware memory devices containing computer-executable instructions, which, when executed by one or more processors, implement a method of mentoring a driver of a vehicle to provide the driver with awareness driving violations that occur while driving, the computer-implemented method comprising:

detecting at a plurality of sensors installed in a vehicle parameters from which data is derived that defines the following information: i) where the vehicle is being driven, ii) date and time as to when the vehicle is being driven, iii) road conditions, iv) how the vehicle is being operated, v) whether vehicle equipment is being correctly used, and vi) one or more driver behaviors that are related to safe driving behaviors;

inputting to an on-board vehicle monitoring system which comprises system memory and one or more processors for data processing, i) the detected parameters from said plurality of sensors installed in the vehicle, ii) thresholds which define criteria against which the detected parameters are evaluated, and iii) identification information for the driver of the vehicle;

the on-board vehicle monitoring system evaluating the input detected parameters by performing the following computer-implemented data processing:

determining a particular date, time and street where the vehicle is traveling; and         determining from the input parameters and the thresholds whether one or more of the following violations is occurring: the vehicle is being operated in an unsafe manner, the driver of the vehicle is engaging in unsafe behavior, or vehicle equipment is failing to be properly utilized or is being improperly utilized.

the on-board vehicle monitoring system broadcasting a warning to the driver when a violation is determined to occur;

the on-board vehicle monitoring system identifying the particular type of violation for which said warning is broadcast to the driver so that the driver is aware of the type of violation;

in response to said broadcast warning, and in response to an observation by the driver that the broadcast warning is inconsistent with actual driving conditions, at the on-board vehicle monitoring system, activating in response to a single driver input a real-time error indication that said broadcast warning issued by the vehicle monitoring system to the driver of the vehicle is an error based on the vehicle driver's observation of the actual traffic conditions or vehicle operation; and     so that the most current parameters are used to evaluate the driver, the vehicle monitoring system storing in system memory the data for the error indication, including storing at least the following for each particular type of violation for which an error indication was input by said driver:

identification of the vehicle identification of the driver, a particular street location the date and time the vehicle was traveling on the particular street, and     the detected parameters giving rise to said particular type of violation for which an error indication was input by the driver.

10. The method of claim 9, further comprising displaying the current vehicle location on a map.

11. The method of claim 9, wherein the particular type of violation for which said warning is broadcast to the driver comprises at least one of posted speed limits and traffic directions.

12. The method of claim 9, wherein the particular type of violation for which said warning is broadcast to the driver comprises displaying a stored value of the particular type of violation broadcast to the driver.

13. The method of claim 9, further comprising sending to a central server or database said data for the error indication in order to enable evaluation of the driver using the most current parameters.

14. The method of claim 13, wherein the database is a street mapping database and wherein said server is monitored by a supervisor of the driver.

15. The method of claim 13, further comprising receiving a replacement entry for the stored value based on the data for the error indication.

16. The method of claim 15, further comprising sending the replacement entry to at least one of a street mapping database provider and a supervisor.

17. An on-board vehicle monitoring system that monitors and reports real-time driving violations to a driver of a vehicle in order to assist the driver in knowing when a violation is occurring, and that permits the driver to identify perceived errors in reported violations which are monitored while driving the vehicle, comprising:

a plurality of sensors installed in a vehicle parameters from which data is derived that defines the following information: i) where the vehicle is being driven, ii) date and time as to when the vehicle is being driven, iii) road conditions, iv) how the vehicle is being operated, v) whether vehicle equipment is being correctly used, and vi) one or more driver behaviors that are related to safe driving behaviors;

inputting to an on-board vehicle monitoring system which comprises system memory and one or more processors for data processing, i) the detected parameters from said plurality of sensors installed in the vehicle, ii) thresholds which define criteria against which the detected parameters are evaluated, and iii) identification information for the driver of the vehicle;

the on-board vehicle monitoring system evaluating the input detected parameters by performing the following computer-implemented data processing:

determining a particular date, time and street where the vehicle is traveling; and         determining from the input parameters and the thresholds whether one or more of the following violations is occurring: the vehicle is being operated in an unsafe manner, the driver of the vehicle is engaging in unsafe behavior, or vehicle equipment is failing to be properly utilized or is being improperly utilized;

the on-board vehicle monitoring system broadcasting a warning to the driver when a violation is determined to occur;

the on-board vehicle monitoring system identifying the particular type of violation for which said warning is broadcast to the driver so that the driver is aware of the type of violation;

in response to said broadcast warning, and in response to an observation by the driver that the broadcast warning is inconsistent with actual driving conditions, at the on-board vehicle monitoring system, activating in response to a single driver input a real-time error indication that said broadcast warning issued by the vehicle monitoring system to the driver of the vehicle is an error based on the vehicle driver's observation of the actual traffic conditions or vehicle operation; and so that the most current parameters are used to evaluate the driver, the vehicle monitoring system storing in system memory the data for the error indication, including storing at least the following for each particular type of violation for which an error indication was input by said driver:

identification of the vehicle, identification of the driver, a particular street location, the date and time the vehicle was traveling on the particular street, and the detected parameters giving rise to said particular type of violation for which an error indication was input by said driver.

18. The system of claim 17, wherein the particular type of violation for which said warning is broadcast to the driver comprises at least one of posted speed limits and traffic directions.

19. The system of claim 17, further comprising a display operable to communicate a stored value of the particular type of violation for which said warning is broadcast to the driver.

20. The system of claim 19, wherein the processor is further operable to receive an indication that the stored value is incorrect.

21. The system of claim 20, wherein the processor is further operable to send the indication to at least one of a street mapping database provider and a supervisor of the driver.

22. The system of claim 19, wherein the processor is further operable to receive a replacement entry for the stored value based on said data for the error indication.

23. The system of claim 22, wherein the processor is further operable to send the replacement entry to at least one of a street mapping database provider and a supervisor.

24. The system of claim 17, wherein the broadcast warning is a visual warning.

25. The system of claim 17, further comprising a central server or database to which said data for the error indication is sent in order to enable evaluation of the driver using the most current parameters.

26. The system of claim 25, wherein the database is a street mapping database and wherein said server is monitored by a supervisor of the driver.

* * * * *